US011648621B2

(12) United States Patent
Pliska et al.

(10) Patent No.: US 11,648,621 B2
(45) Date of Patent: May 16, 2023

(54) SYSTEMS AND METHODS TO DESIGN PART WELD PROCESSES USING MEDIA LIBRARIES

(71) Applicant: Illinois Tool Works Inc., Glenview, IL (US)

(72) Inventors: Adam Pliska, Neenah, WI (US); Leland Falde, Jackson, MI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/671,560

(22) Filed: Nov. 1, 2019

(65) Prior Publication Data

US 2020/0139471 A1 May 7, 2020

Related U.S. Application Data

(60) Provisional application No. 62/755,039, filed on Nov. 2, 2018.

(51) Int. Cl.
*B23K 9/095* (2006.01)
*G06F 3/04845* (2022.01)
(Continued)

(52) U.S. Cl.
CPC .......... *B23K 9/0953* (2013.01); *B23K 9/0956* (2013.01); *G06F 3/0482* (2013.01);
(Continued)

(58) Field of Classification Search
CPC .... B23K 9/0953; B23K 9/0956; B23K 31/02; G05B 19/402; G05B 2219/32014;
(Continued)

(56) References Cited

U.S. PATENT DOCUMENTS

2002/0116388 A1\* 8/2002 Clement ................. G06Q 10/10
2002/0156761 A1\* 10/2002 Chen ...................... G06Q 10/10
(Continued)

FOREIGN PATENT DOCUMENTS

EP          2530899     12/2012
WO       2009005602     1/2009

OTHER PUBLICATIONS

Int'l Search Report and Written Opinion Appln No. PCT/US2019/059593 dated Feb. 26, 2020 (13 pgs.).

*Primary Examiner* — Tuan C Dao
(74) *Attorney, Agent, or Firm* — McAndrews, Held & Malloy, Ltd.

(57) ABSTRACT

Systems and methods to design part weld processes using media libraries are disclosed. An example system to generate weld instructions for display to a weld operator during a welding sequence, the system including: a processor; and a machine readable storage device comprising machine readable instructions which, when executed by the processor, cause the processor to: provide an interface to define a weld program comprising a sequence of weld instructions for display to a weld operator during a weld sequence; in response to an input specifying a location of an object in a media library, defining an element in the weld program based on an identifier of the object in the media library; and generating the weld program by including the identifier of the object in the media library in association with the element.

19 Claims, 16 Drawing Sheets

(51) Int. Cl.
  *G06F 3/0486* (2013.01)
  *G06F 3/0482* (2013.01)
  *G06F 30/20* (2020.01)
  *G06F 119/18* (2020.01)
(52) U.S. Cl.
  CPC ........ *G06F 3/0486* (2013.01); *G06F 3/04845* (2013.01); *G06F 30/20* (2020.01); *G06F 2119/18* (2020.01)
(58) Field of Classification Search
  CPC ........... G05B 2219/32194; G05B 2219/35214; G06F 30/20; G06F 3/04845; G06F 3/0486; G06F 2119/18; G06F 3/0482; G06F 3/0415; Y02P 90/30; G06Q 10/06316; G06Q 50/04
  See application file for complete search history.

(56) References Cited

U.S. PATENT DOCUMENTS

| | | | |
|---|---|---|---|
| 2006/0138116 A1* | 6/2006 | Lipnevicius | B23K 9/125 219/137.71 |
| 2007/0100855 A1* | 5/2007 | T. Kohl | G06F 16/192 |
| 2007/0136282 A1* | 6/2007 | Takashima | G11B 20/00695 |
| 2007/0164006 A1* | 7/2007 | Burgstaller | B23K 31/125 219/130.01 |
| 2009/0313549 A1* | 12/2009 | Casner | G05B 19/406 715/740 |
| 2011/0178935 A1* | 7/2011 | Chaubey | G06Q 10/06 705/301 |
| 2013/0067237 A1* | 3/2013 | Huang | G06F 16/113 713/189 |
| 2013/0247183 A1* | 9/2013 | Kumar | G06F 21/56 726/22 |
| 2014/0229513 A1* | 8/2014 | Shiell | G06F 16/13 707/803 |
| 2014/0336795 A1* | 11/2014 | Asenjo | G05B 19/4083 700/86 |
| 2014/0337277 A1* | 11/2014 | Asenjo | G06Q 10/06 707/603 |
| 2015/0069029 A1* | 3/2015 | Daniel | B23K 9/0953 219/125.1 |
| 2015/0086009 A1* | 3/2015 | Harjula | H04L 9/088 380/44 |
| 2018/0253556 A1* | 9/2018 | Karaginides | G06F 21/572 |
| 2018/0336723 A1* | 11/2018 | Elmer | G06F 16/972 |

* cited by examiner

SYSTEMS AND METHODS TO DESIGN PART WELD PROCESSES USING MEDIA LIBRARIES

RELATED APPLICATIONS

This patent claims priority to U.S. Provisional Patent Application Ser. No. 62/755,039, filed Nov. 2, 2018, entitled "SYSTEMS AND METHODS TO DESIGN PART WELD PROCESSES USING MEDIA LIBRARIES." The entirety of U.S. Provisional Patent Application Ser. No. 62/755,039 is incorporated herein by reference.

FIELD OF THE DISCLOSURE

This disclosure relates generally to welding, and more particularly, to systems and methods to design part weld processes using media libraries.

BACKGROUND

Many high volume, complex welded assemblies are produced using manual or semi-automated production welders. The repetitive nature of these welding operations and the high production rates that are required eventually lead to welder fatigue. Therefore, missing or defective welds on these welded assemblies is a quality assurance problem.

To identify defective welds, sensors that measure current, wire feed, voltage, and gas flow are used to enable the quality of a weld to be determined. The information produced by the sensors allows defective welds or welds of a quality less than a pre-determined quality to be identified.

Furthermore, many manufacturing equipment companies have insufficient or outdated procedural documentation for producing parts. Production specifications are often passed down informally (e.g., orally).

SUMMARY

Systems and methods to design part weld processes are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1:
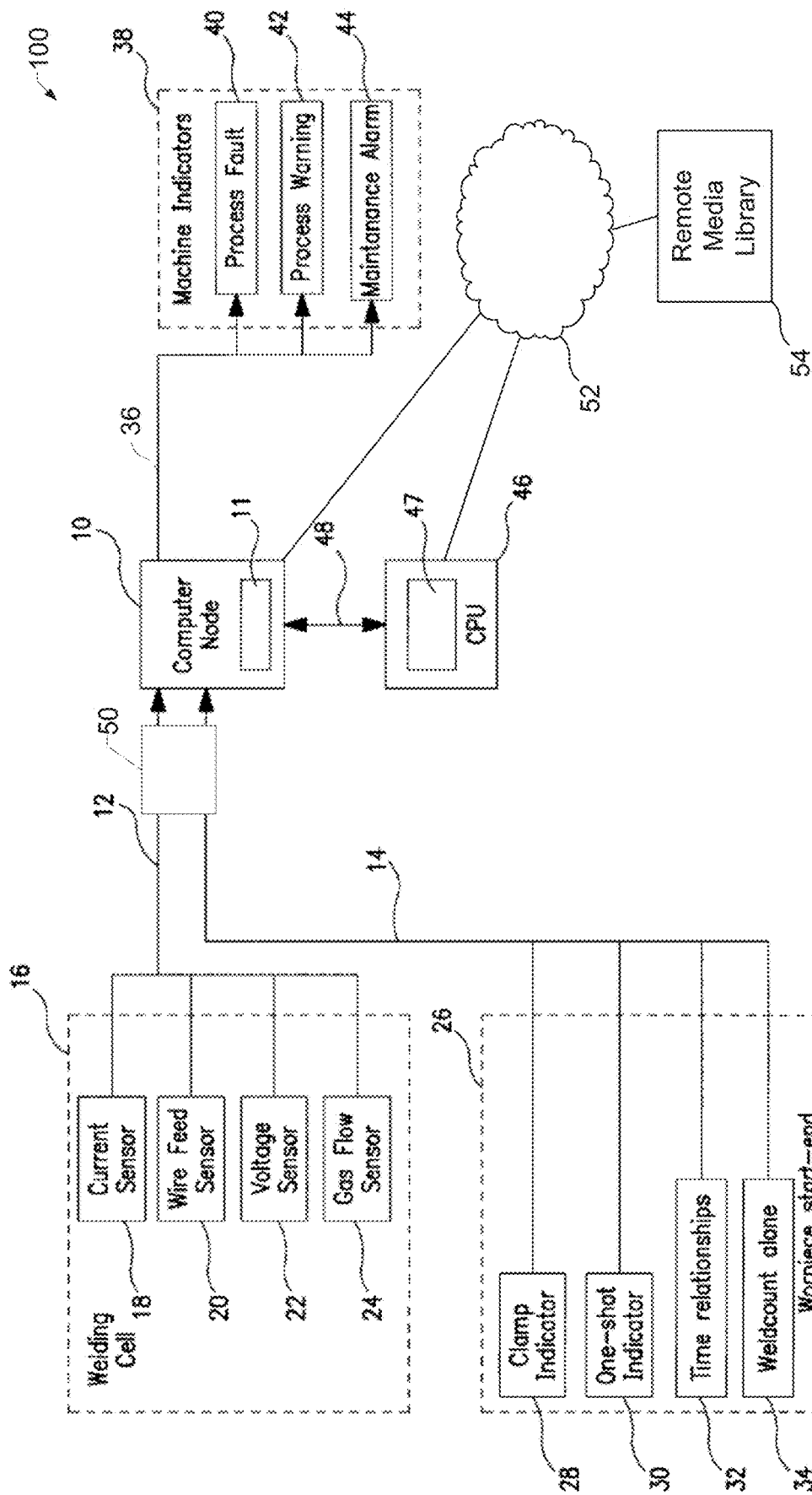
FIG. 1 is a schematic diagram of an example system to provide arc-weld monitoring with part-tracking system, in accordance with aspects of this disclosure.

Disclosed example systems and methods provide a media library for storage and use of media components during the creation of a part weld process definition and/or performance of the part weld process definition. Media items can be stored, for example, in a host operating system and/or file system, inside a database that is used to store configuration data for the part weld processing system, and/or a remote database.

In some examples, the media library is implemented as a network-accessible system, such as in a cloud computing system. By providing access to a media library via a network, a media library facilitator can provide access to media components under a variety of circumstances. For example, equipment providers, equipment servicers, weld program service providers, and/or any other entity can manage repositories of media items for automatic and/or manual download into the media system of an authorized user. As an example, a weld program service provider may create and curate a selection of media components that are useful to customers and provides added value by saving the customer the time to create such media components. The media components may be made available for lease, purchase, on a subscription basis, and/or in conjunction with equipment or services.

Disclosed examples also enable a user to: store media in conjunction with a host OS on which a weld program definition interface is executed; categorize media components in accordance with the user's desired organization structure; and/or synchronize local copies of a media library with remote copies.

In some examples, the media system assigns a unique identifier to media components, which may be stored in conjunction with metadata for the media component in the media library. Additionally or alternatively, a hash value may be derived from a hashing process applied to the bytes that make up the component data. The hash value allows the media system to monitor components that are moved inside the host operating system, because the components keep the byte structure and, thus, the hash value, even when moved to new locations. The hash value can be used to identify changes to the underlying component data, such as when an operator replaces one component in the media library with another component with the intention that instances of the component used in weld programs are likewise updated. Disclosed systems and methods can use the hash to repair or restore components, even if those media items are restored to different locations within the host operating system.

Example components may include weld instructions, slides, parts, slide masters, audio data, video data, images, and/or any other media or data structure that may be used to define weld programs.

Disclosed examples improve ease of use for weld engineers and/or other users who build weld programs and/or other sets of instructions to be followed by a weld operator. In particular, disclosed example systems and methods provide the user with a library of media that is easy to manage (e.g., add, delete, and/or update components) and easy to use to implement media components into weld programs. Furthermore, the media library enables users to easily update weld programs with updated media instead of replacing individual instances of media components with the updated component.

An additional benefit provided by disclosed example systems and methods is to improve the transfer of institutional knowledge from experienced welders to better educate the next generation of welders and monitor performance.

As used herein, the term "part" refers a logical grouping of steps necessary to complete a unit of work. The logical grouping of steps defining a part may relate to a manufactured part (i.e., assembly, component, product, etc.) on a manufacturing floor.

As used herein, the term "slide" refers to a view. A slide may contain multiple welds defined within the view.

As used herein, the term "slide master" refers to a slide template, from which one or more slides may be created using properties defined for the slide master.

As used herein, the term "weld instruction" refers to a welding-related operation, which may involve actually welding (e.g., arc-on activity), preparing to weld, cleaning up after welding, fetching components, shift-related activity, and/or any other operations. A slide may contain multiple welding-related operations or weld instructions, and a weld represented by the weld instruction may be tracked and distinguished from other welds by a weld monitoring system using sensors. A weld instruction may be duplicated across multiple slides or parts.

Disclosed example systems to generate weld instructions for display to a weld operator during a welding sequence include: a processor; and a machine readable storage device comprising machine readable instructions which, when executed by the processor, cause the processor to: provide an interface to define a weld program comprising a sequence of weld instructions for display to a weld operator during a weld sequence; in response to an input specifying a location of an object in a media library, defining an element in the weld program based on an identifier of the object in the media library; and generating the weld program by including the identifier of the object in the media library in association with the element.

In some example systems, the instructions cause the processor to access the media library to determine a list of objects in the media library, and display at least a subset of the objects in the media library via the interface. In some examples, the instructions cause the processor to identify a selection of the object in the media library via the interface, and add the object to a slide of the weld program based on referencing the identifier of the object in the media library. In some examples, the instructions cause the processor to: identify a selection of the object in the media library via the interface; generate a weld instruction based on referencing the identifier of the object in the media library; and generate the weld program to include the weld instruction. In some examples, the instructions cause the processor to identify a change to the object at the identifier in the media library, and update the display of the subset of the objects in the media library.

In some examples systems, the instructions cause the processor to access the media library via at least one of a local area network or a wide area network. In some examples, the instructions cause the processor to authenticate at least one of the interface, a user of the interface, or an owner of the interface prior to accessing the media library. In some example systems, the identifier of the object includes at least one of a location of the object in a data structure of the media library or a globally unique identifier of the object. In some examples, the identifier of the object includes a hash of data associated with the object.

In some example systems, the instructions cause the processor to request a location based on a hash associated with the object in response to identifying a change in location of the object in the media library, and update a location of the object in the weld program. In some examples, the object includes at least one of: image data, audio data, video data, a weld program comprising a plurality of weld instructions, a slide template, a three-dimensional model, or a part. In some examples, the instructions cause the processor to access a second object, and provide the second object to the media library for storage.

Disclosed example systems for monitoring welding of components of a workpiece with multiple arc welds in a fixture include a computing device storing a weld program defining weld instructions for performing the multiple arc welds, the computing device configured to: parse the weld program to identify weld instructions associated with a sequence of welds for the workpiece; for at least one of the weld instructions, identify a reference to a media library associated with the weld instruction; and display the at least one of the weld instructions based on the reference to the media library.

In some example systems, the computing device is configured to store a copy of the media library on a local storage device of the computing device. In some examples, the computing device is configured to: update the copy of the media library; and update the weld instruction based on changes to the copy of the media library. In some examples, the reference to the media library includes at least one of a virtual location of the object or a globally unique identifier of the object. In some examples, the reference is associated with at least one of: image data, audio data, video data, a weld program comprising a plurality of weld instructions, a slide template, a three-dimensional model, or a part.

In some examples, the computing device is configured to request the object based on a hash associated with the object in response to identifying a change in location of an object in the media library based on the reference, and display the at least one of the weld instructions based on a response to the request. In some examples, the computing device is configured to update the reference in the weld program with an updated location of the object based on the response. Some example systems further include one or more weld sensors configured to collect data associated with the multiple arc welds, wherein the computing device is configured to determine statuses of the multiple arc welds based on the data.

FIG. 1 is a block diagram that illustrates an example arc-weld monitoring with part-tracking system 100. The system 100 operates a network including one or more computing devices operably connected by a network to one or more central computing systems 46. Each computing device 10 receives sensor inputs 12 and digital inputs 14 from welding cell 16 in which one or more welds is being applied to a workpiece. Each computing device 10 can display real-time information concerning a weld on text display screen 11. Example sensor inputs 12 include weld quality information provided by a current sensor 18, a wire feed sensor 20, a voltage sensor 22, and/or a gas flow sensor 24. Example digital inputs 14 include information related to starts and/or ends of a workpiece (e.g., workpiece start-end 26), which may include a clamp indicator 28 and/or a one-shot indicator 30. Additionally or alternatively, the workpiece start-end 26 may be programmed into the computing device 10 and include time relationships 32 and/or weld count 34 alone.

The example computing device 10 processes sensor input 12 and/or digital input 14, and generates one or more digital outputs 36. Example digital outputs 36 include machine indicators 38 such as a process fault 40, a process warning 42, and/or maintenance alarms 44. The digital output 36, which indicates the status of the weld just completed and the requirements for the next weld to be made, can be provided to the operator (e.g., welder) who is welding the workpiece and/or to a system operator for monitoring an automated welding operation. In some examples, when a weld is determined to be defective, the digital output 36 causes the welding operation to stop, which allows the defective weld to be repaired or the workpiece with the defective weld to be discarded. The example computing device 10 tracks sensor input 12 and digital input 14 for each weld of a plurality of welds in the workpiece (e.g., a part) and quality determination(s) made for each weld of the part.

The central computing system 46 includes a display 47 and is operatively connected 48 to the computing device(s) 10. The central computing system 46 operates the computer program that is used to configure the computing device(s) 10 for particular welding operation(s) and/or to receive the information from the computing device 10 for data logging, further weld analysis, statistical process control (SPC), and/or part-tracking. The computing system 46 can be connected to a plurality of computer nodes for monitoring welding operations in a plurality of welding cells by means of a computer network 52. The example computing system 46 performs part-tracking by receiving and storing information related to the welding operations from the various computing devices. After performance of welds and capture of weld information by the computing device(s) 10, the example computing system 46 may receive the weld information from the computing device(s) 10 and/or display the weld information on the display 47.

As described in more detail below, the example central computing system 46 and/or the computing device(s) 10 may include one or more computers, servers, workstations, and/or any other type of computing system, and may enable administrators, weld engineers, and/or other personnel to design the weld instructions that are to be displayed in or near the weld cell 16 (e.g., via the computing device 10) and performed by the weld operators. Disclosed examples enable easier part weld process design via user interfaces, including dragging and dropping weld components or instructions from a library onto a slide to create weld instructions, defining events and/or weld instructions in response to events, enforcing rules during part weld process design, and/or defining slide masters for use in creating multiple slides.

In the example of FIG. 1, the computing device(s) 10 and/or the computing system(s) 46 may connect to a remote media library 54 (e.g., via the network 52) to access assets for inclusion in weld programs. The computing device(s) 10 and/or the computing system(s) 46 may store components in the remote media library 54 for subsequent retrieval. Additionally or alternatively, the computing device(s) 10 and/or the computing system(s) 46 may access components stored in the remote media library 54, such as components that have been previously uploaded and/or stored, purchased from and/or otherwise provided by a third party, accessed in conjunction with a subscription arrangement, and/or according to any other access and/or authorization scheme. The example remote media library 54 may be implemented using one or more servers or other computing devices, such as in a cloud computing arrangement or other infrastructure.

Figure 2:
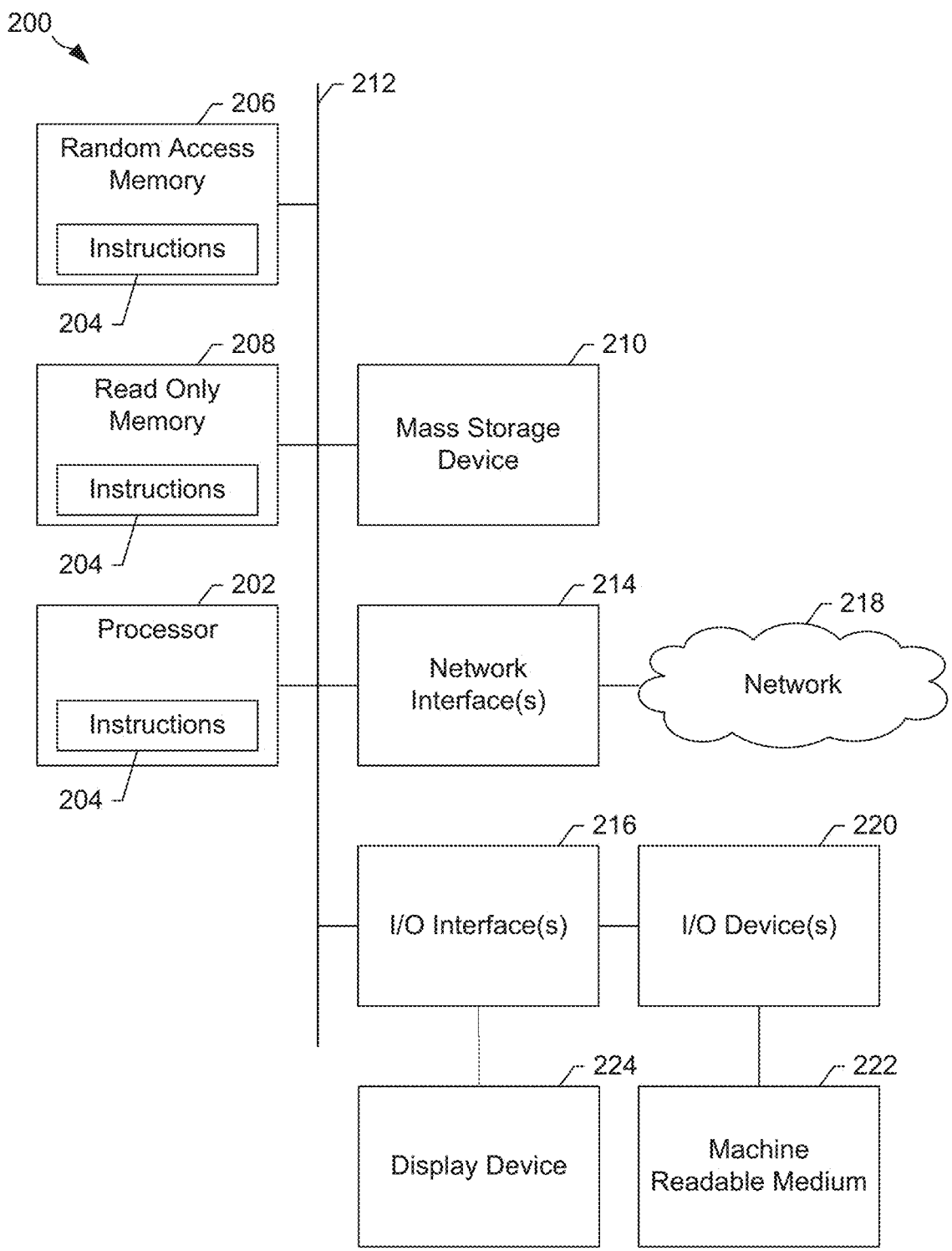
FIG. 2 is a block diagram of an example computing system that may be used to implement the computing device or the central computing system of FIG. 1.

FIG. 2 is a block diagram of an example computing system 200 that may be used to implement the computing device 10, the central computing system 46, and/or the remote media library 54 of FIG. 1. The example computing system 200 may be implemented using a personal computer, a server, a smartphone, a laptop computer, a workstation, a tablet computer, and/or any other type of computing device.

The example computing system 200 of FIG. 2 includes a processor 202. The example processor 202 may be any general purpose central processing unit (CPU) from any manufacturer. In some other examples, the processor 202 may include one or more specialized processing units, such as RISC processors with an ARM core, graphic processing units, digital signal processors, and/or system-on-chips (SoC). The processor 202 executes machine readable instructions 204 that may be stored locally at the processor (e.g., in an included cache or SoC), in a random access memory 206 (or other volatile memory), in a read only memory 208 (or other non-volatile memory such as FLASH memory), and/or in a mass storage device 210. The example mass storage device 210 may be a hard drive, a solid state storage drive, a hybrid drive, a RAID array, and/or any other mass data storage device.

A bus 212 enables communications between the processor 202, the RAM 206, the ROM 208, the mass storage device 210, a network interface 214, and/or an input/output interface 216.

The example network interface 214 includes hardware, firmware, and/or software to connect the computing system 200 to a communications network 218 such as the Internet. For example, the network interface 214 may include IEEE 202.X-compliant wireless and/or wired communications hardware for transmitting and/or receiving communications.

The example I/O interface 216 of FIG. 2 includes hardware, firmware, and/or software to connect one or more input/output devices 220 to the processor 202 for providing input to the processor 202 and/or providing output from the processor 202. For example, the I/O interface 216 may include a graphics processing unit for interfacing with a display device, a universal serial bus port for interfacing with one or more USB-compliant devices, a FireWire, a field bus, and/or any other type of interface. The example weight indicator 116 includes a display device 224 (e.g., an LCD screen) coupled to the I/O interface 216. Other example I/O device(s) 220 may include a keyboard, a keypad, a mouse, a trackball, a pointing device, a microphone, an audio speaker, an optical media drive, a multi-touch touch screen, a gesture recognition interface, a magnetic media drive, and/or any other type of input and/or output device.

The example computing system 200 may access a non-transitory machine readable medium 222 via the I/O interface 216 and/or the I/O device(s) 220. Examples of the machine readable medium 222 of FIG. 2 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

Part Weld Process Design

As used herein, the term "part" refers a logical grouping of steps necessary to complete a unit of work. The logical grouping of steps defining a part may relate to a manufactured part (i.e., assembly, component, product, etc.) on a manufacturing floor.

Figure 3:
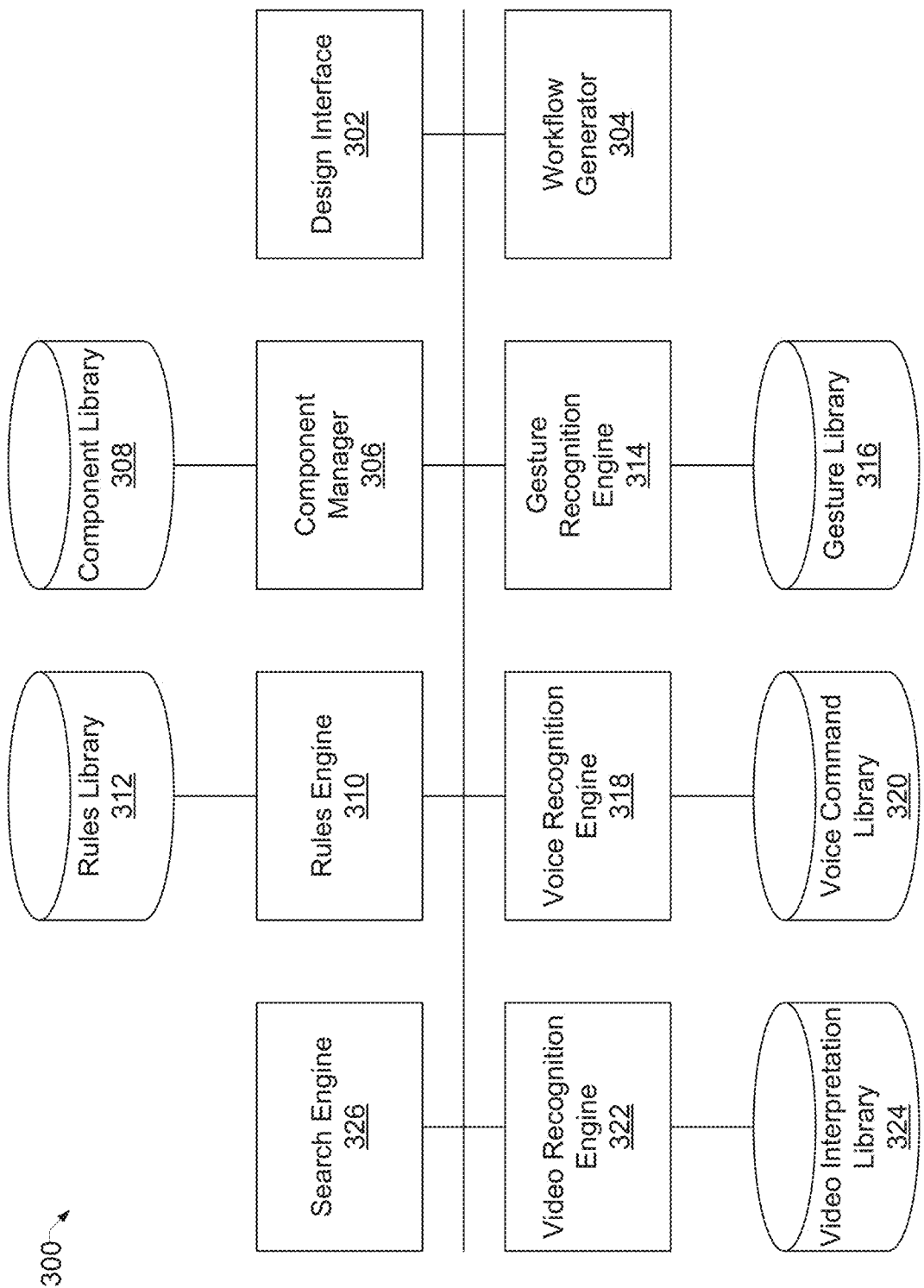
FIG. 3 is a block diagram of an example computing system to design a workflow or part weld process, in accordance with aspects of this disclosure.

FIG. 3 is a block diagram of an example computing system 300 to design a workflow or part weld process. The example computing system 300 may be implemented as any combination of hardware, firmware, and/or software, such as software components executed by the computing system 200.

The example computing system 300 includes a design interface 302 to receive input and provide output for design of a part weld process, including workflow and/or slides. The design interface 302 may be implemented using the display device 224 and one or more of the I/O devices 220 of FIG. 2. In some examples, the part weld process is at least partially constructed or defined using one or more slides. As used herein, a "slide" refers to a single visual screen that can be created and/or edited by a designer (e.g., an administrator, a shop foreman, an engineer, etc.) via the design interface 302 to show one or more of the steps in a larger unit of work. The process to complete a part may involve multiple slides shown to a weld operator in a sequence.

The part weld processes may further include workflows. When executed (e.g., at the computing device 10), workflows include events that may trigger responsive weld instructions within the workflow based on inputs to the computing device 10, slides that are shown to the weld operator to provide weld instructions, weld instructions that may block further execution until appropriate interaction occurs by the weld operator, real-time weld quality monitoring and feedback during the workflow, and/or any other weld instructions. A workflow generator 304 creates workflows based on slides, events, instructions, and/or other inputs received via the design interface 302. During the runtime welding process, the weld operator is presented with the diagram that has been designed on the slide. The weld operator uses the diagram and associated weld instructions to understand and perform the steps necessary to complete the part or other unit of work defined in the workflow.

Using the example computing device 10 and/or the computing system 46 of FIG. 1, a designer can design visual slides, which may visually represent or resemble a schematic, which a weld operator uses during production to understand the steps necessary to finish the part or other unit of work. A component manager 306 of the computing system 300 manages components stored in a component library 308. The example component library 308 may include and/or implement a media library. Example components may include elements (e.g., shapes), welds, annotations, images, media (e.g., audio, video), user control objects, merge fields, weld instructions, slide templates, three-dimensional models, parts, and/or areas. However, any other component type may be used. The component manager 306 may also manage assemblies, or complex elements, that include previously constructed combinations of components. Assemblies may be combined by the component manager 306 such that the composing elements are treated as a single object in the user interface.

Components may be created, selected, added to slides, modified, deleted from slides, and/or otherwise manipulated by a designer or maintenance personnel of the computing system 300 via the design interface 302, and changes are stored by the example component manager 306 in the component library 308.

In some examples, visual elements may be selected and positioned onto a slide using an input device (e.g., a computer mouse, a touchscreen, etc.). Those elements are dragged from a pool of elements, welds, annotations, images, and areas, and dropped onto a working canvas that represents the slide. Disclosed examples enable part weld process design using unconventional design tools, such as a digital pen, a drawing tablet, an external touch interface, a secondary mobile/desktop application, augmented reality gestures, and/or other tools.

Figure 4:
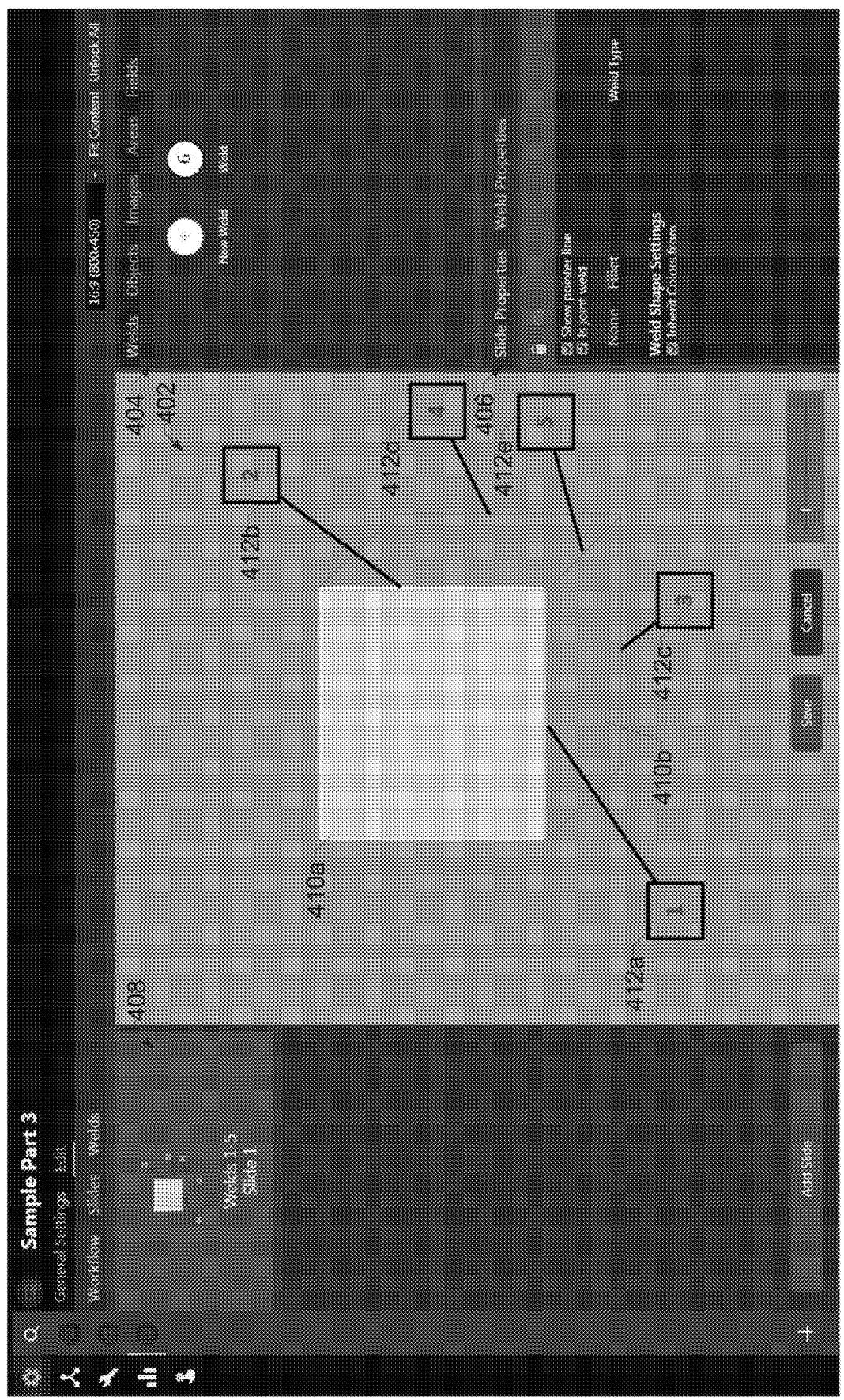
FIG. 4 illustrates an example design interface that may be used to implement the design interface of FIG. 3.

FIG. 4 illustrates an example design interface 400 that may be used to implement the design interface 302 of FIG. 3. The example design interface 400 includes a slide canvas 402, a component selector 404, a component properties manager 406, and a slide menu 408. The slide canvas 402 is a visual representation of the weld instructions that are shown to the operator via the computing device 10 during operation. Components such as part elements 410a, 410b and weld indicators 412a, 412b, 412c, 412d, 412e may be dragged from the component selector 404 to a desired position on the slide canvas 402. The component selector 404 enables a designer to select any component available from the component library 308 for inclusion in the slide canvas 402. The example component manager 306 also track deletion of previous components from the slide canvas 402 and may make resulting changes to other components. For example, if a first weld in a weld order (e.g., the weld indicator 412a) is removed from the slide canvas 402, the example component manager 306 adjusts the weld numbers of the remaining weld indicators 412b-412e and makes another weld indicator available in the component selector 404.

The component properties manager 406 enables a designer to specify certain properties of the slide and/or of the component(s). The specified properties are stored by the component manager 306 in the component library 308. Example properties include definition of colors, and inheritance of one or more properties from other slides or components.

The slide menu 408 enables creation and/or deletion of slides from a part weld process, and/or selection of particular slides of a part weld process for modification.

Figure 5:
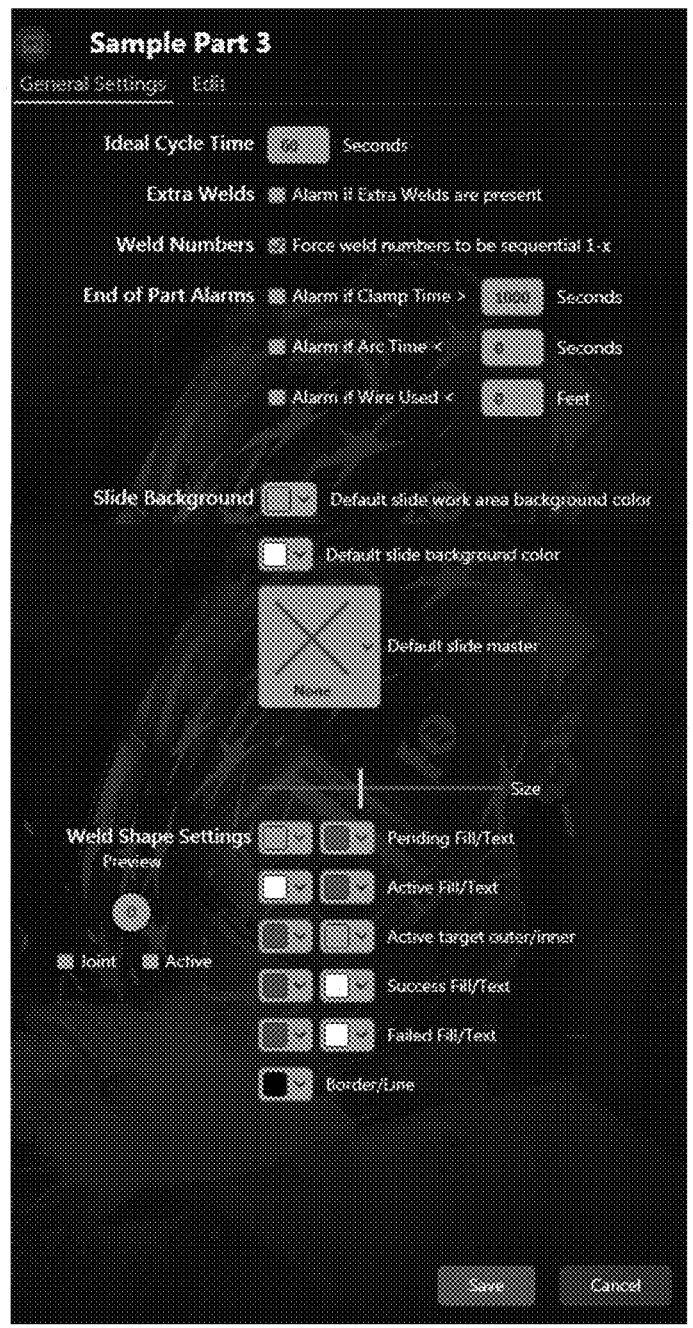
FIG. 5 illustrates an example part weld process properties interface that may be used to implement the design interface.

FIG. 5 illustrates an example part weld process properties interface 500 that may be used to implement the design interface 302. The example part weld process properties interface 500 of FIG. 5 includes global properties for the slides and/or components in a selected part weld process. For example, the global properties may be applied to each slide, event, component, and/or weld instruction created for the part weld process unless overridden at the individual slide, event, component, and/or weld instruction. Example global properties include slide and/or component default colors, a selection of a slide master for creating slides, weld limits (e.g., number limits, weld count limits, etc.), part time limits, and/or any other properties.

A rules engine 310 enforces aspects of a part weld process based on a set of custom and/or system-defined rules. Rules may involve visual display of slides, behavior of a part weld process, weld instruction management, and/or any other rules that may be defined. Rules are stored in a rules library, and may be global (e.g., applying to all parts), public (e.g., selectively applicable to parts), private (e.g., applicable to specific parts), and/or have any combination of global, public, and/or private characteristics.

During part weld process design using disclosed example systems (e.g., drag-and-drop operations) the rules engine 310 may maintain the visual look of the slide and the integrity. For example, a rule may be enforced that a slide can have only one instance of a defined weld at any given time. The rules engine 310 enforces the rule during drag and drop operations. Control modifiers such as keystrokes may be used to change design behavior when dragging and dropping components, such as using the "ctrl," "shift," and/or "alt" keys to modify the operation of the rules engine during the drag/drop operation.

Additionally or alternatively, the rules engine 310 may maintain a consistent visual appearance of objects in a slide by managing appearance configurations for components. For example, components added to a slide can have many different visual appearances (e.g., fill color, border color, size, etc.). The rules engine 310 may help the designer maintain a consistent appearance by storing and duplicating visual settings from previously-added components to newly-added components. Thus, the rules engine may reduce the configuration being done by the user, such as having to manually configure the appearance of each and every component added to the slide while maintaining the consistent component appearance.

In some examples, a designer may copy one or more components of one part weld process, and duplicate the components into one or more other part weld processes to save time. The example rules engine 310 maintains the configurations of the duplicated components from the part weld process that follows a set of rules both defined by Miller (as the creator of the application) and defined by the end user to meet their requirements. For example, the rules engine 310 may enforce a rule that a slide can have only one instance of a defined weld (e.g., only one "weld 1," only one "weld 2," etc.). During a copy/paste operation involving a numbered weld, the rules engine 310 may enforce the weld numbering by changing one or more conflicting weld numbers.

The example computing system 300 includes a gesture recognition engine 314 that recognizes gestures by a designer and takes actions based on the recognized gesture(s). The example gesture recognition engine 314 enables the designer to add various weld symbols and/or other elements to their slides using a touch screen and/or gestures. As used herein, the term "gesture" refers to one or more freehand strokes with an input device that are interpreted to take an action. For example, the gesture recognition engine 314 may recognize a gesture (e.g., via touchscreen, mouse, augmented reality gestures, 3D camera input, etc.) and perform the associated action. Gesture characteristics (e.g., the features used to recognize a gesture) and gesture responses (e.g., actions taken in response to a gesture) are stored in a gesture library 316 and accessed by the gesture recognition engine 314 for gesture recognition and/or response. When the gesture is recognized, the computing system 300 takes one or more actions corresponding to the identified gesture.

Example gestures may involve freehand drawings, specific motion patterns, and/or gestures, of simple shapes that are interpreted to insert a corresponding component or take a specific action. For example, a designer draws a crude weld symbol on the slide. In response, the gesture recognition engine 314 places a weld symbol of the type matching the drawn symbol and automatically number the weld. The designer may further enhance the weld symbol with borders, fills, text in the center, and/or other modifications.

Recognition of gestures and/or reaction to gestures may occur immediately and/or as a batch. The use of gestures may be more natural to some designers. Using gestures, a designer can draw the slide freehand, and the gesture recognition engine 314 converts the drawn elements to corresponding objects, symbols, and/or properties, corresponding to the locations in which the elements are drawn. Thus, disclosed examples improve the ease and speed with which part weld process design is accomplished.

In some examples, the designer can create and store custom gestures in the gesture library 316. The designer may apply the custom gestures to desired commands, such as frequently used commands and/or shapes used by the designer during part weld process design.

Figure 6A:
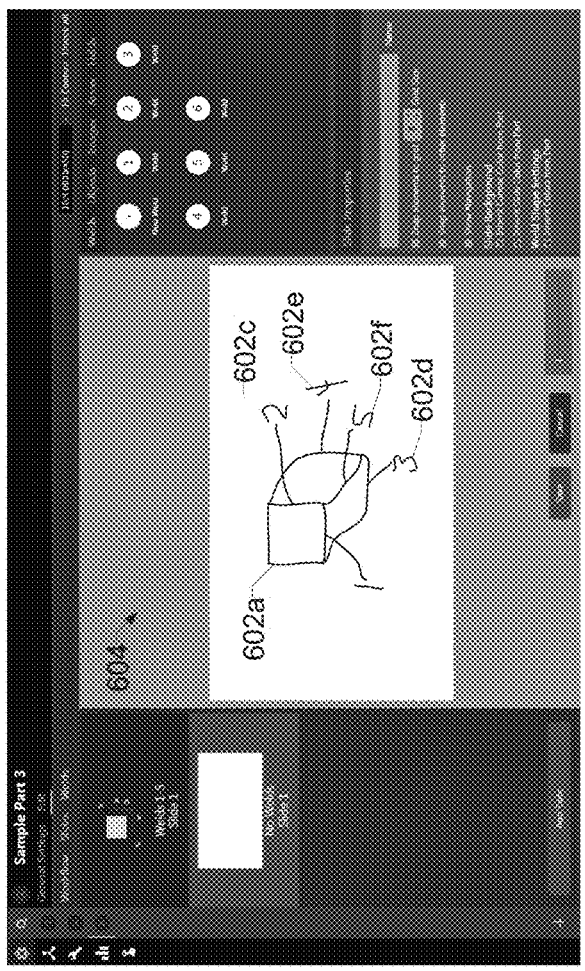
FIG. 6A illustrates a set of example gestures on a slide canvas.
Figure 6B:
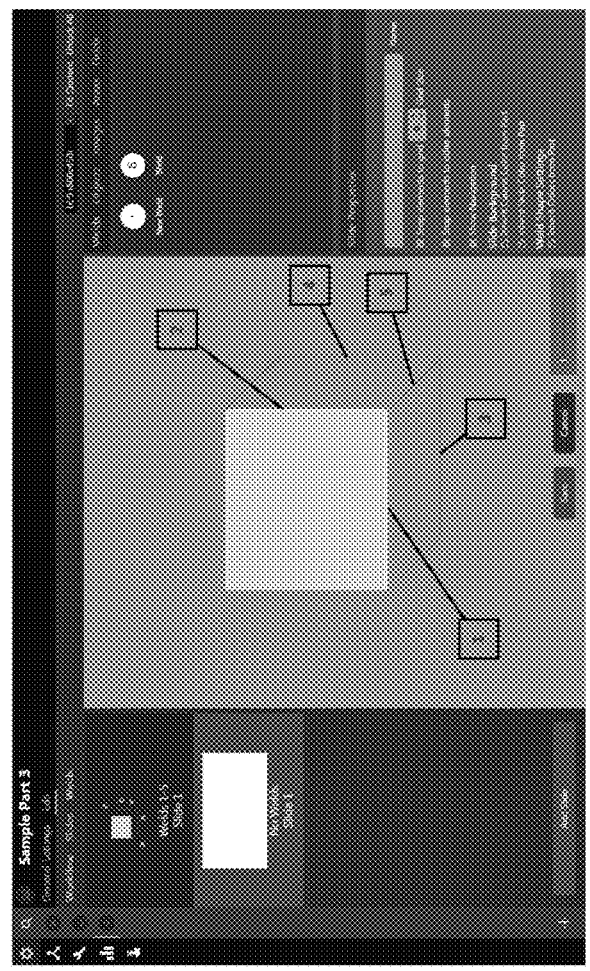
FIG. 6B illustrates the resulting component and weld instructions on the slide canvas after interpretation of the gestures of FIG. 6A.

FIGS. 6A and 6B illustrate an example interface 600 that may be used to implement the design interface 302 of FIG. 3 before and after interpretation of example gestures by the gesture recognition engine 314. FIG. 6A illustrates a set of example gestures 602a-602f on a slide canvas 604. The gestures 602a-602f including a component gesture 602a (e.g., a workpiece) and multiple weld indicator gestures 602b-602f, including the weld number of each weld indicator. FIG. 6B illustrates the resulting component and weld instructions on the slide canvas after interpretation of the gestures.

Figure 7:
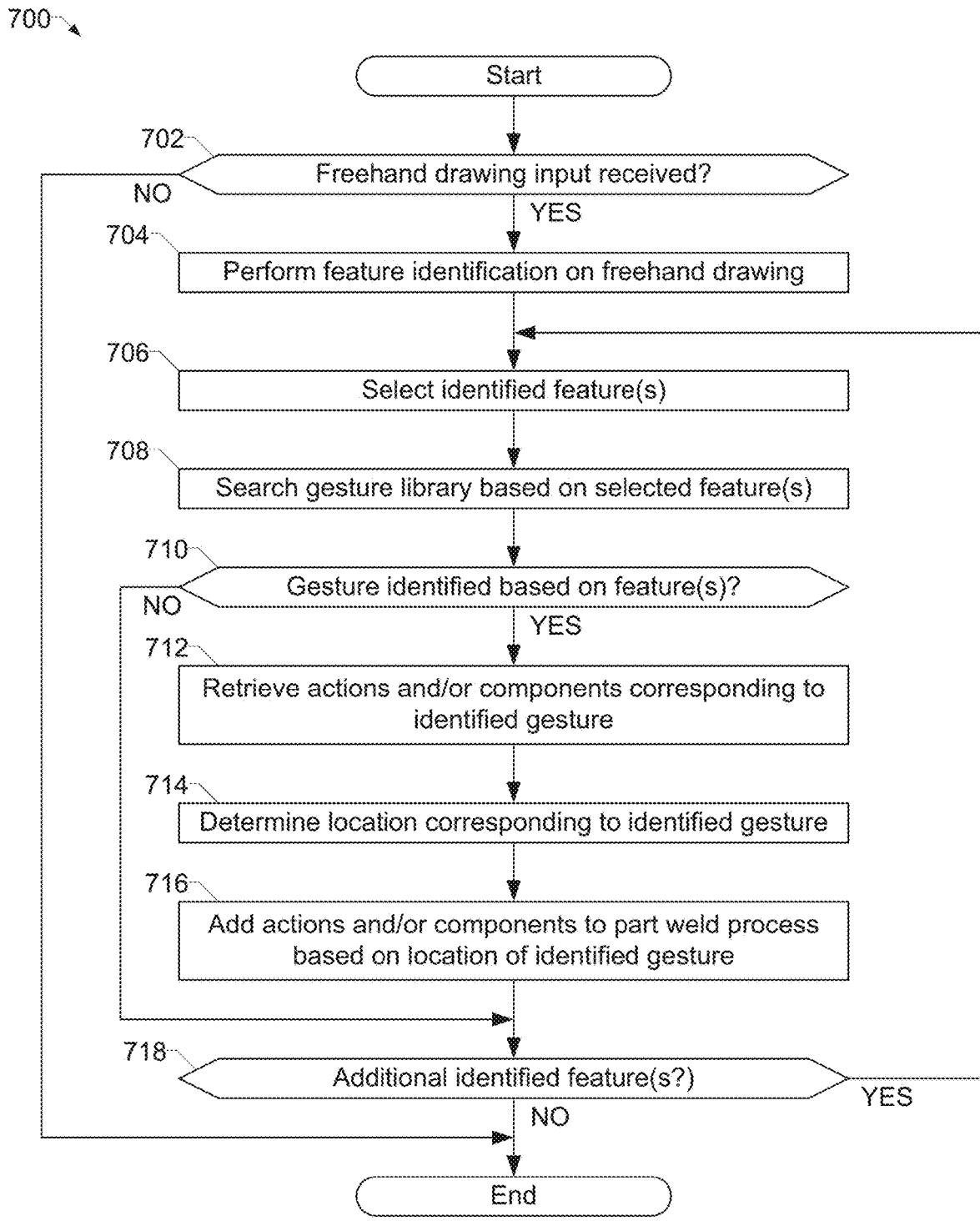
FIG. 7 is a flowchart representative of example machine readable instructions which may be executed to generate weld instructions and/or other aspects of a part weld process using gesture recognition.

FIG. 7 is a flowchart representative of example machine readable instructions 700 which may be executed to generate weld instructions and/or other aspects of a part weld process using gesture recognition. The example instructions 700 may be performed by the example computing system 46, the computing system, 200 and/or the computing system 300 of FIGS. 1, 2, and/or 3. The example instructions 700 are described below with reference to the computing system 300, which may be implemented by the processor 202 executing the instructions 204 of FIG. 2.

At block 702, the gesture recognition engine 314 determines whether freehand drawing input has been received. If freehand drawing input has been received (block 702), at block 704 the gesture recognition engine 314 performs feature identification on the freehand drawing input. For example, the gesture recognition engine 314 may use any type of feature recognition techniques to identify and/or classify features in the freehand drawing input. The gesture recognition engine 314 may reference feature definitions in the gesture library 316 to identify features.

At block 706, the gesture recognition engine 314 selects one or more identified feature(s). At block 708, the gesture recognition engine 314 searches the gesture library 316 based on the selected feature(s). For example, codes or data representative of the feature(s) may be used to lookup gestures stored in the gesture library 316.

At block 710, the gesture recognition engine 314 determines whether any gestures have been identified based on the selected feature(s). If one or more gestures have been identified based on the selected feature(s) (block 710), at block 712 the gesture recognition engine 314 retrieves (e.g., from the gesture library 316) actions and/or components corresponding to the identified gesture(s).

At block 714, the gesture recognition engine 314 determines a location (e.g., on a slide containing the freehand drawing input) corresponding to the identified gesture. The type of gesture may determine the location of the corresponding feature. At block 716, the gesture recognition engine 314 adds actions and/or components to the part weld process based on the location of the identified gesture. For example, the gesture recognition engine 314 may add weld instructions in the form of actions or components by looking up the gesture in the gesture library 316 and determining the associated weld instructions.

After adding the actions and/or components (block 716), or if no gestures are identified using the selected feature(s) (block 710), at block 718 the gesture recognition engine 314 determines whether additional feature(s) and/or combinations of features may be used to identify gestures. If there are additional feature(s) and/or combinations of features (block 718), control returns to block 706 to select other feature(s).

When there are no additional feature(s) and/or combinations of features (block 718), or if no freehand drawing input has been received (block 702), the example instructions 700 end.

Additionally or alternatively to gestures, the designer may create slides using voice commands. The example computing system 300 includes a voice recognition engine 318 that receives audio input, parse the audio to recognize words and/or phrases in the audio, and take one or more actions in response to recognizing the words and/or phrases. A voice command library 320 may store the words and/or phrases, including preset words and/or phrases and/or custom words and/or phrases selected by the designer (or other user). For example, during design of the slide a designer can say one or more predetermined words or phrases that trigger the voice recognition engine 318 to recognize the stated words and/or phrases, look up the corresponding actions in the voice command library, and take the corresponding actions. Example phrases may add, modify, or delete components, select particular components within a slide, duplicate components, and/or take any other actions.

Figure 8:
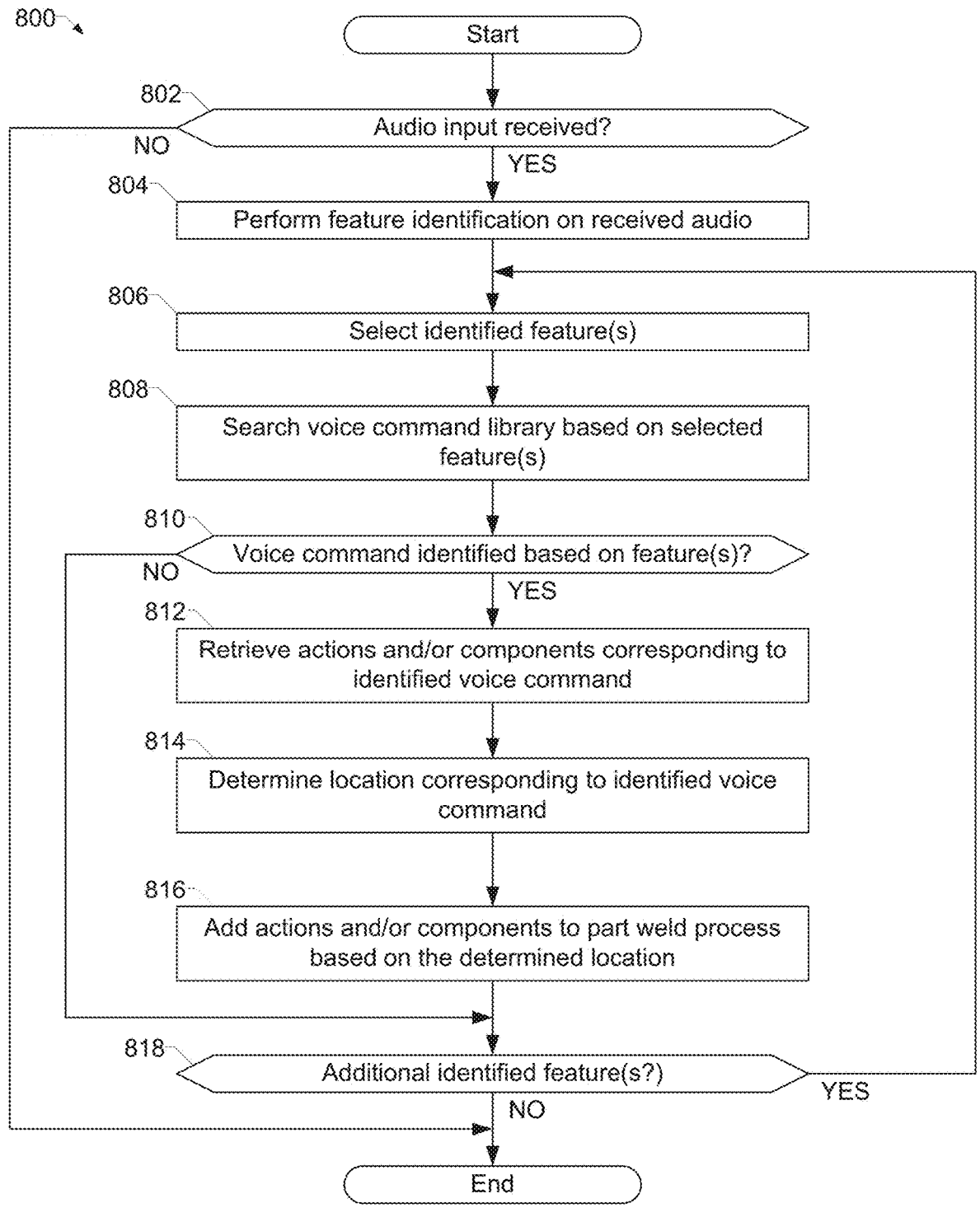
FIG. 8 is a flowchart representative of example machine readable instructions which may be executed to generate weld instructions and/or other aspects of a part weld process using voice command recognition.

FIG. 8 is a flowchart representative of example machine readable instructions 800 which may be executed to generate weld instructions and/or other aspects of a part weld process using voice command recognition. The example instructions 800 may be performed by the example computing system 46, the computing system, 200 and/or the computing system 300 of FIGS. 1, 2, and/or 3. The example instructions 800 are described below with reference to the computing system 300, which may be implemented by the processor 202 executing the instructions 204 of FIG. 2.

At block 802, the gesture recognition engine 314 determines whether audio input has been received. If audio input has been received (block 802), at block 804 the voice recognition engine 318 performs feature identification on the audio input. For example, the voice recognition engine 318 may use any type of voice recognition or identification techniques to identify and/or classify features in the audio input. The voice recognition engine 318 may reference voice features in the voice command library 320 to identify features.

At block 806, the voice recognition engine 318 selects one or more identified feature(s). At block 808, the voice recognition engine 318 searches the voice command library 320 based on the selected feature(s). For example, hashes representative of the audio feature(s) may be used to lookup audio or voice commands stored in the voice command library 320.

At block 810, the voice recognition engine 318 determines whether any voice commands have been identified based on the selected feature(s). If one or more voice commands have been identified based on the selected feature(s) (block 810), at block 812 the voice recognition engine 318 retrieves (e.g., from the voice command library 320) actions and/or components corresponding to the identified voice command(s).

At block 814, the voice recognition engine 318 determines a location (e.g., on a slide active at the time the audio input was received, or otherwise indicated in the voice command) corresponding to the identified voice command. The voice command and/or additional information included as auxiliary voice information may determine the location of the corresponding feature. At block 816, the voice recognition engine 318 adds actions and/or components to the part weld process based on the determined location. For example, the voice recognition engine 318 may add weld instructions in the form of actions or components by looking up the voice command in the voice command library 320 and determining the associated weld instructions.

After adding the actions and/or components (block 816), or if no voice commands are identified using the selected feature(s) (block 810), at block 818 the voice recognition engine 318 determines whether additional feature(s) and/or combinations of features may be used to identify voice commands. If there are additional feature(s) and/or combinations of features (block 818), control returns to block 806 to select other feature(s).

When there are no additional feature(s) and/or combinations of features (block 818), or if no audio input has been received (block 802), the example instructions 800 end.

The example computing system 300 further includes a video recognition engine 322 and a video interpretation library 324. In some examples, the computing system 300 generates a workflow and/or weld instructions using video of a weld operator captured while that operator performed assigned operations. The operations may be related to a specific part and/or more general work-related functions. Video interpretation instructions may be generated and/or stored by manually training the video recognition engine 322 to recognize activities and/or context by using sample video and/or corresponding sample data from other sensors in the weld cell.

For example, using video interpretation techniques stored in the video interpretation library 324 (e.g., 2D video recognition, stereoscopic and/or 3D video recognition, etc.), the video recognition engine 322 may recognize operations involving fitting, clamping, welding, cleaning, and/or otherwise creating a part. The video recognition engine 322 may additionally or alternatively recognize operations involving weld cell cleaning, consumable replacement, equipment maintenance, and/or any other functions performed by the operator that are not necessarily part-related. The example video recognition engine 322 constructs slides and/or part weld processes based on analyzing the video, which may be done in conjunction with other data such as monitored weld data and/or other sensors observing activity or data within the weld cell. The example video recognition engine 322 may construct slides and/or part weld processes that can later be used by other operators to duplicate the recorded weld operator's efforts.

Figure 9:
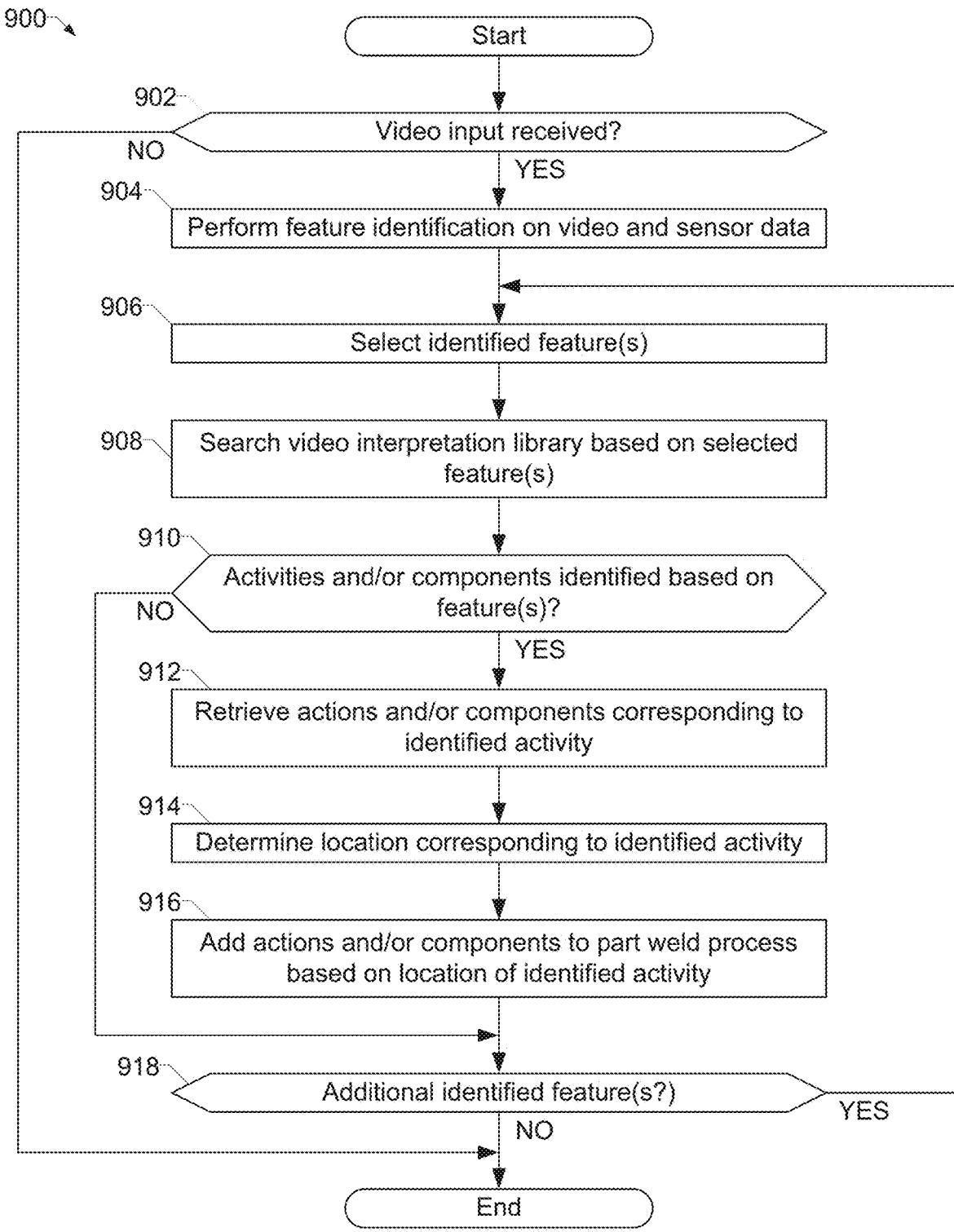
FIG. 9 is a flowchart representative of example machine readable instructions which may be executed to generate weld instructions and/or other aspects of a part weld process using video interpretation and recognition.

FIG. 9 is a flowchart representative of example machine readable instructions 900 which may be executed to generate weld instructions and/or other aspects of a part weld process using video interpretation and recognition. The example instructions 900 may be performed by the example computing system 46, the computing system, 200 and/or the computing system 300 of FIGS. 1, 2, and/or 3. The example instructions 900 are described below with reference to the computing system 300, which may be implemented by the processor 202 executing the instructions 204 of FIG. 2.

At block 902, the video recognition engine 322 determines whether video input has been received. For example, a designer may select a video from a file system using the design interface 302 for analysis by the video recognition engine 322. Video input may include images captured in one or more spectra (e.g., visible light, infrared, ultraviolet, etc.), depth maps, three-dimensional scanning, and/or any other type of captured video.

If video input has been received (block 902), at block 904 the video recognition engine 322 performs feature identification on the video input and/or sensor data associated with the video. For example, the video recognition engine 322 may use any type of image and/or video recognition and/or identification techniques, which may include machine learning, to identify and/or classify features in the video input. The video recognition engine 322 may use sensor data captured simultaneously with the video to assist in determining actions that are occurring in the weld cell. For example, voltage, current, wire speed, and/or brightness sensors may indicate that welding is occurring. Clamping sensors may indicate that part fitting has been completed. The video recognition engine 322 may reference video features in the video interpretation library 324 to identify features and/or actions.

At block 906, the video recognition engine 322 selects one or more identified feature(s). Features may include video and/or image features, sensor data, and/or any other associated information. If three-dimensional scanning or other operator detection video is used, the features may include operator body positioning. At block 908, the video recognition engine 322 searches the video interpretation library 324 based on the selected feature(s). For example, the video interpretation library 324 may search based on colors, operator body position, sensor data, and/or any other data obtained as an identified feature and/or combination of features.

At block 910, the video recognition engine 322 determines whether any activities and/or component(s) has been identified based on the selected feature(s). If one or more activities have been identified based on the selected feature(s) (block 910), at block 912 the video recognition engine 322 retrieves (e.g., from the video interpretation library 324) actions and/or components corresponding to the identified activity and/or component.

At block 914, the video recognition engine 322 determines a location corresponding to the identified activity. For example, the video recognition engine 322 may identify a part on which the weld operator is working and, more specifically, the portion of the part on which the weld operator is performing an activity. For example, the video recognition engine 322 may identify that tack welding is occurring on the part along a particular seam, or that a weld is occurring at a particular location, and generate a corresponding weld instruction. At block 916, the video recognition engine 322 adds actions and/or components to the part weld process based on the determined location.

For example, the video recognition engine 322 may add weld instructions in the form of actions or components by looking up the activity in the video interpretation library 324 and determining the associated weld instructions. The example video interpretation library 324 may determine the shape and/or contours of a part to be manufactured by, during fitting of the part by the operator, using three-dimensional scanning or other techniques to determine the contours of the components, the assembly process performed by the operator, and the resulting assembly of components. The example video recognition engine 322 may identify the locations to be welded based on the recognized assembly and/or recognize the welds that are performed by the operator.

After adding the actions and/or components (block 916), or if no components or activities are identified using the selected feature(s) (block 910), at block 918 the video recognition engine 322 determines whether additional feature(s) and/or combinations of features may be used to identify components and/or activities. If there are additional feature(s) and/or combinations of features (block 918), control returns to block 906 to select other feature(s).

When there are no additional feature(s) and/or combinations of features (block 918), or if no video input has been received (block 902), the example instructions 900 end.

The example design interface 302 enables a designer to use two-dimensional components (e.g., images) and/or three-dimensional components. For example, an image may be generated based on a perspective view of a three-dimensional computer model (e.g., a two-dimensional image of the three-dimensional model taken from a specified point-of-view). The model, the image, the perspective, and/or one or more references to the source material may be stored in the component library 308 and/or managed by the component manager 306. The design interface 302 may enable the user to manipulate three-dimensional models within the slide design interface, and/or add a component (e.g., an image) generated using a three-dimensional modeling tool such as a computer aided drafting (CAD) program.

The three-dimensional computer model and the perspective may be linked (e.g., by the component manager 306) such that, if changes are made to the model, any perspectives of that model that are used to create slides are automatically updated to reference the updated three-dimensional model. In some examples, the computing device 10 references the model and renders an updated image when the workflow is executed to ensure the most recent version is used. In other examples, the designer may update the workflow slides with an updated rendering to reduce the computing load on the computing device 10 during execution of the workflow.

Disclosed weld process design systems and methods provide a faster and more intuitive visual design system for generating and editing visual work instructions that make up a part or other unit of work. Disclosed systems and methods provide a clear indications of available components that can be added to a visual set of work instructions. Example systems and methods enable designers to capture existing processes in a manner that allows the processes to later be duplicated by individuals other than the individuals who created the process, such as by creating a corresponding set of work instructions from the captured processes.

Weld Instruction Workflows

Figure 10:
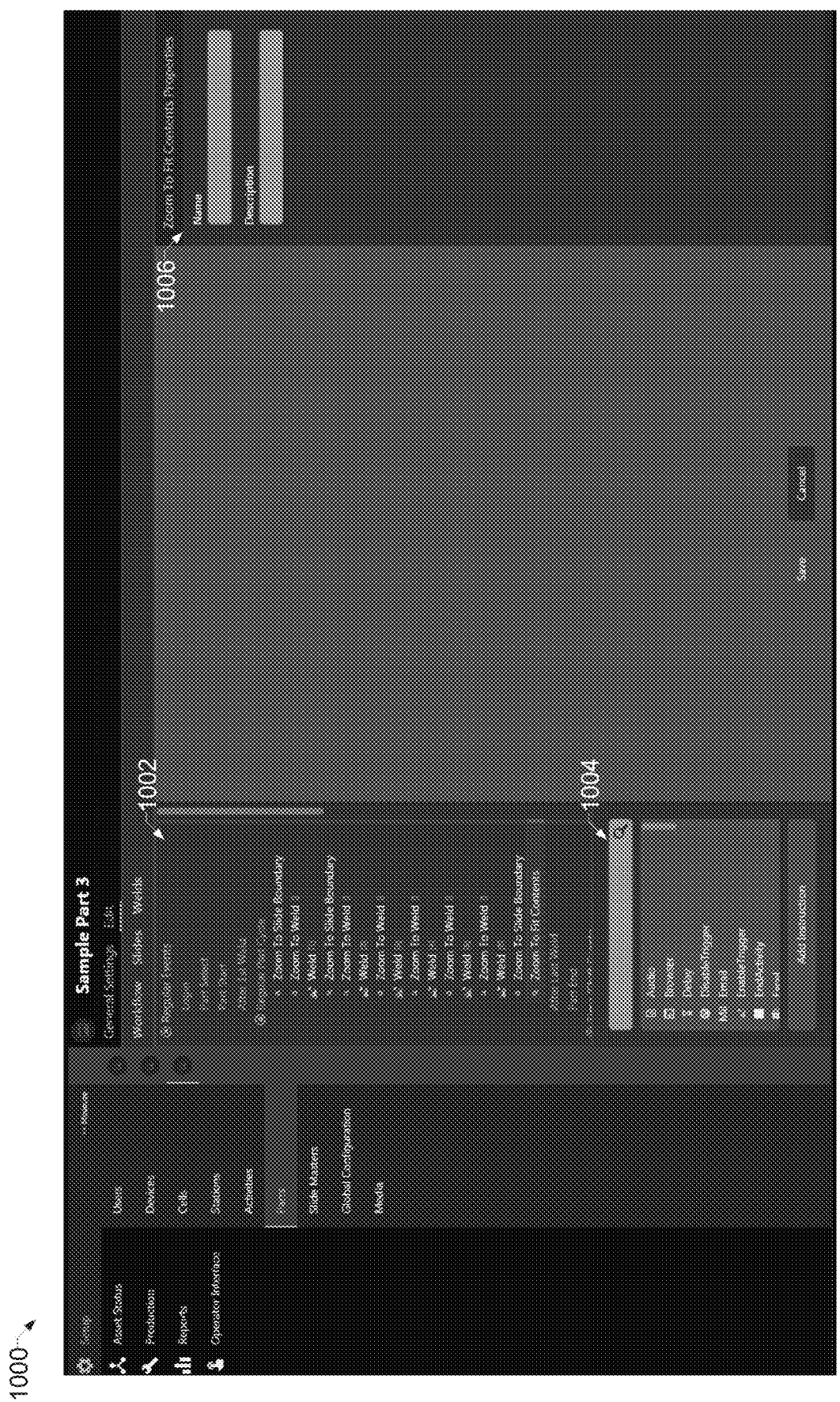
FIG. 10 illustrates an example workflow interface that may be used to design a workflow in a part weld process.

FIG. 10 illustrates an example workflow interface 1000 that may be used to design a workflow in a part weld process. The example workflow interface 1000 may implement the example design interface 302 of FIG. 3. The workflow interface 1000 enables a designer to modify workflows that affect a selected part, multiple parts, equipment, and/or an operator (e.g., the operator's shift).

The example workflow interface 1000 includes a workflow definition list 1002 that includes the list of events to which the workflow may respond. For example, a "regular part cycle" event may be performed during normal performance of the part weld process of the particular part, and involves a set of defined weld instructions that are set by the designer. The workflow interface 1000 also includes an instruction selector 1004 from which a designer may select weld instructions to associate with an event in the workflow definition list 1002. The workflow interface 1000 further includes an instruction configuration interface 1006 that display configurable properties of a selected weld instruction and enables a designer to modify the configurable properties.

During operation using a part weld process (e.g., using the computing device 10 of FIG. 1 to display weld instructions to the weld operator), events may be triggered by inputs to the computing device 10 and/or events internally identified by the computing device 10. Example inputs to the computing device 10 may include weld-related devices (e.g., data from a welding power supply, torch trigger, wire feeder, etc.), data from weld cell sensors (e.g., the sensors 18-24), weld monitoring devices (e.g., the weld data collection device 50 of FIG. 1), and/or an external computing system (e.g., the computing system 46 of FIG. 1). Additionally or alternatively, logic-driven or rule-driven events may be generated by the computing device 10 by combining inputs and/or data.

An example event that may be identified at the computing device 10 includes a change in an Operational Digital Interface state. For example, changes in state at a Digital interface to a weld monitor (e.g., the weld data collection device 50) or a power supply can trigger a context specific event at the weld monitor, the power supply, the computing device, the external computing system 46, and/or at any other device. Example Digital Interface states that may be used as inputs by the weld monitor 50 may include an input received for beginning part tracking, an input received for ending part tracking, an input received for resetting of a part or set of weld instructions, an input received for a weld fault event, and/or an input received for a selection of a part type. When received or identified by the weld monitor 50, the inputs may be used as triggers for other events or instructions. Example Digital Interface states that may be used as outputs by the weld monitor 50 to another device may include an output occurring in response to identifying a missing weld, an output occurring in response to identifying an incomplete weld, an output occurring in response to identifying a weld that violates process control limits, and/or an output occurring in response to identifying an extra weld.

As an example, the Digital Interface state outputs may cause disabling of the weld torch trigger and/or disabling of weld output at the power supply.

In some examples, an event may be triggered by a supervisor. For example, a shop or floor supervisor (or other authorized person) may instigate events in the welding cell as desired, such as a supervisor requesting an activity identification. The workflow interface 1000 may be used to establish an operator prompt at the computing device 10 in response to the supervisor-triggered event. The supervisor may be limited to triggering specific events, or may be permitted to trigger any available event.

Another example event is a robotic communications event. The robotic communications events may be limited to automatic or semi-automatic part weld processes, and extends the interface capabilities of a weld monitoring system to interpret and/or utilize movement and/or welding information from the fixture and robot within the welding cell.

In some examples, two or more events may be used to create a combined event that is triggered according to a logical condition. For example, the events may use logical conjunctions, disjunctions, mutual exclusion, and/or any other logic to define an event using other events. An example combined event may be "Event A AND (Event B or Event C)." The workflow interface 1000 enables the part weld process designer to create and configure combined events. Additionally or alternatively, logical events may be defined using logical flows (e.g., branching) with multiple individual events and multiple possible results from the logical event. Following different sequences of individual event triggers in a logical event results in different potential weld instructions. Weld instructions may be provided at the conclusion of a logical path of events and/or within a path of events (e.g., after execution of an event while waiting for the next event branch).

Similarly to logical events, in some examples, events are dependent on both the occurrence of the triggering input and one or more other conditions or stimuli. For example, conditional events based on input stimuli from the welding cell and its context may require a non-event condition to be present or not-present when a specified event occurs to be triggered. Conditional events may be used in conjunction with combined events and/or logical events.

The example instruction selector 1004 enables the designer to attach one or more weld instructions in response to events. Example instructions that may be selected to be part of a workflow include performing a weld (e.g., showing a weld on the relevant slide), showing the operator information associated with a weld (e.g., training information, specific weld instructions, etc.), providing non-welding work instructions to the operator (e.g., cleaning the work area, replacing consumables, etc.), sending messages, prompting the operator to review, acknowledge, and/or provide information via a dialog, and/or any other action.

During part weld process design, the designer defines welds that will occur on the part. Designing the weld instructions includes defining the visual properties of the configuration. The design interface 302 may include a visual property selection section that enables the designer to select a whether to instruct the computing device 10 to zoom into the weld when the weld is active, and the welder is working on the weld. In some examples, the designer may indicate to the computing device 10 that the computing device 10 should zoom out after the weld is complete.

An example instruction that may improve clarity for weld operators during a welding operation involves changing a zoom level of the display. For example, instructions may include zooming to a weld (e.g., changing a zoom level to focus on a particular weld, zooming to a particular area of a slide based on location of a particular specified weld), zooming to an area (e.g., zooming to a particular specified area of a slide), zooming to a slide boundary (e.g., zooming to a particular specified area of a slide, including snapping to a boundary of the slide), zooming to fit an entire slide, zooming to fit any selected component, zooming to fit contents (e.g., zooming so as to include all the specified contents or components, such a group of selected components or all components belonging to a part or shape), and/or enabling the weld operator to specify the zooming. In some examples, time-adjacent zooming actions involve panning and/or changing a zoom level directly from a first zoom to a second zoom. Alternatively, time-adjacent zooming actions involve zooming out from the first zoom level before zooming into the second zoom level, which can help orient the welder to the portion of the slide in the second zoom level and reduce mistakes.

Zooming may be used to reduce mistakes during welding by increasing focus on areas to be given increased care. The ability to define zooming may also reduce slide design time by enabling the designer to use the same slide while emphasizing different parts of the slide, instead of creating multiple slides to provide the same information.

Other example instructions may involve setting and/or clearing a digital interface state (e.g., at the weld data collection device 50). For example, setting and/or clearing a digital interface state may be used to provide digital interface control via programming workflow work instructions and events.

In some examples, the identity, qualifications, metrics, certifications, and/or role of the weld operator may be used as an input to one or more events. Execution and/or bypassing of work instructions may be dependent on the specifics of the actual weld operator who is logged in. For example, weld instructions may be configured to execute instructions when an operator does not have particular training and/or bypassed when the operator is known to have the training and/or a threshold number of parts completed.

Slide Masters

The example design interface 302 of FIG. 3 may be used to create slide masters. In some examples, the design interface 302 uses slide masters as backgrounds that can be designed and reused on individual slides. The design interface 302 enables creation of slide masters similarly way to creating a slide.

Slide masters may be provided a name or other identifier, and a visual thumb is created to represent the slide master. During the part design process, the designer can select a slide master to be used for creating slides. When a slide master is chosen for one or more slides, the slide(s) display the slide master under other added elements. Changes to slide masters are propagated through to each slide referencing the slide master. In some examples, the slide master is used as a background image behind the components on a slide. A thumbnail image may be used to represent slide masters for selection.

In some other examples, the slide master is used as a starting slide. Instances of every component on the slide master are created and populated onto each slide. During the design of the slide, the instances of each component generated based on the slide master may be manipulated in a manner similar or identical to components introduced to the specific slide.

The example design interface 302 may enable chaining of slide masters (e.g., using one slide master to create a second slide master. and/or selection of more than one slide master to individual slide.

The example design interface 302 enables creation and manipulation of shapes. In some examples, the design interface 302 enables shapes to be designed like slides. Visual representations of items are dragged and/or otherwise added to the slide canvas and/or arranged by the designer. When the desired shape and/or set of visual objects are arranged and configured, the designer can save the arrangement as a new shape using the component manager 306. The newly defined shape is stored in the component library 308 and can be used in other slides, slide masters, and/or designing additional custom shapes. The designer is able to reuse the shapes on many slides, thereby saving the designer time. If the shape is modified at a later time, the user may choose to apply changes to the shape to one or more (e.g., all) of the places where the shape is used. In some examples, changes to the shape in the component library 308 causes the component manager 306 to automatically update all instances of the shape in all slides and/or slide masters.

The example component library 308 may include pre-created shapes and/or slide masters, which are made available to users of the computing system 300. The user can copy the pre-created shapes and use the shapes in custom weld part process designs.

In some examples, shapes may include variable fields or other components that are populated based on data collected during a weld. The variable fields are managed as components (e.g., similar to shapes) and may be used in specific situations to show specific data to the weld operator. In some examples, the use of such shapes is limited to certain events or other situations. For example, a results page shape may be available to be displayed at the completion of a part weld process, and include variable fields having end-of-part process-specific information populated within the shape based on weld data collected during the part weld process.

An operation interface control may be added to slides or other weld operator interface components using the design interface 302. Operation interface controls are shown to a weld operator during normal weld process steps, and may be displayed independently of the slides and/or other part weld process information. Operation interface controls enable organizations to display organization-specific custom information to weld operators. The operation interface control may be a configurable dashboard screen that permits a designer to specify the information shown to weld operators, the format in which the information is shown, and/or the locations in which the information is seen on the display.

In some examples, the design interface enables a designer to dynamically design end-of-weld documents to track the weld for a period of time following manufacture (e.g., for an expected life of the weld or part). The end-of-weld documents may be considered a type of "birth certificate" for the weld or part, which contain information describing the manufacture of the part or weld. Each organization could require different information on end-of-weld documents, and end-of-weld documents may be designed using a template. The end-of-weld document template may be used to create a hard copy (like a PDF) of the document at the completion of the weld or part. The end-of-weld document can later be reviewed to understand the dynamics of the weld or part as the weld or part was made, and/or other information that was recorded during the making of the weld or creation of the part.

Disclosed examples can significantly reduce visual weld process development time by enabling custom shapes for users to apply, categorizing shapes and/or templates, and/or altering existing shapes to propagate changes to a number of different slides, templates, and/or shapes.

Figure 11:
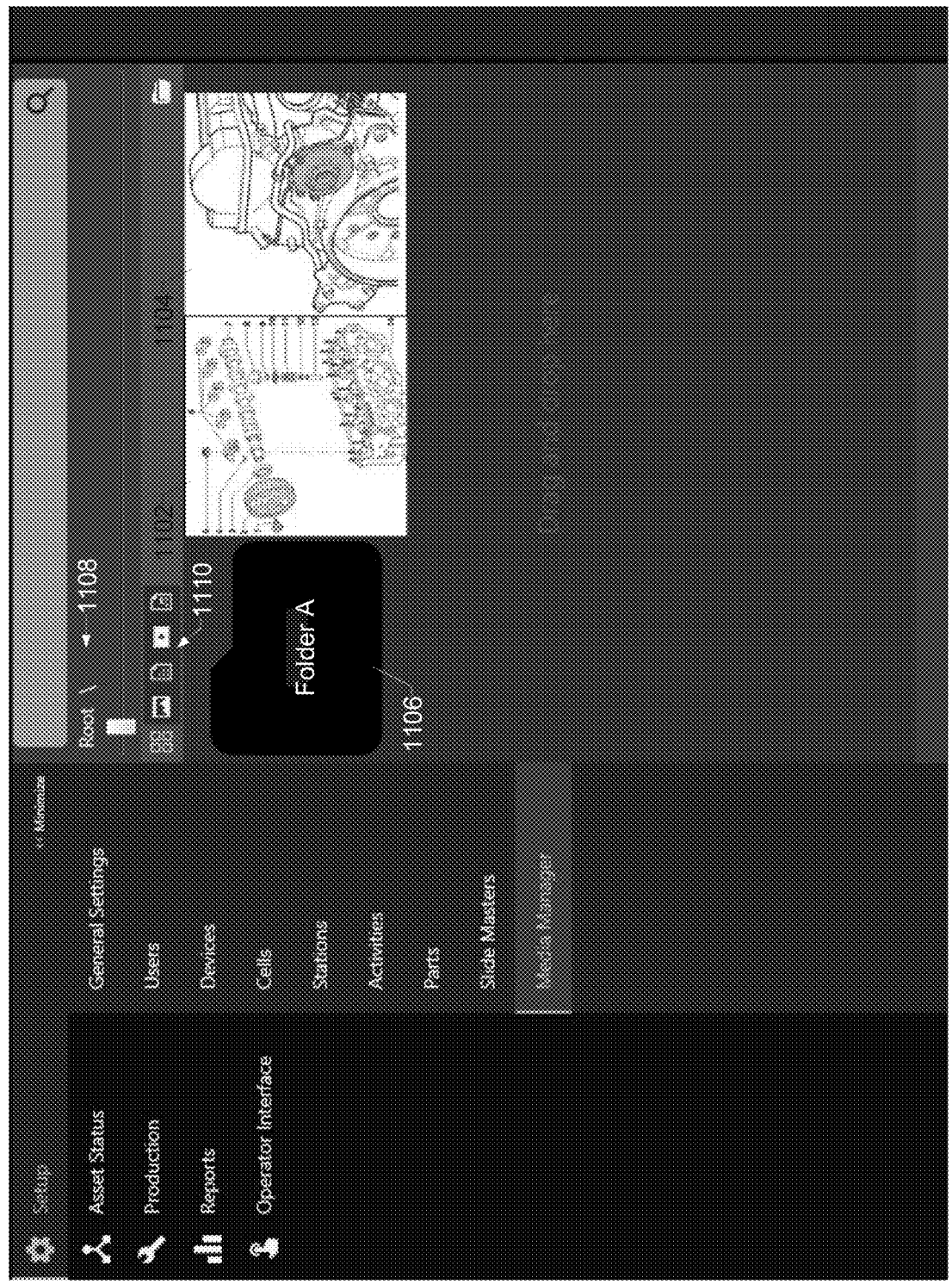
FIG. 11 illustrates an example design interface that may be used to implement the design interface of FIG. 3 to access a media library storing components that may be used to generate a weld program.

FIG. 11 illustrates an example design interface 1100 that may be used to implement the design interface 302 of FIG. 3 to access a media library storing components that may be used to generate a weld program. For example, the design interface 1100 may access one or more component libraries 308 that are stored on the computing system 46 used to provide the design interface 1100 and/or one or more remote computing system and/or servers via one or more networks.

The example interface 1100 provides access to one or more media libraries to enable the user to add and/or remove components, update components, organize components, and/or otherwise manage components that may be used to produce weld programs. The interface 1100 includes example components 1102, 1104 (e.g., image files) located in a root folder, and a subfolder 1106. The interface 1100 includes a location indicator 1108 and data type filters 1110.

The interface 1100 enables a user to add components to the media library via a dialog and/or dragging and dropping the desired component or media into the interface 1100. Existing digital assets possessed by the user (e.g., 3D CAD models, existing external library of digital documentation assets, and/or any other assets) may be added via gesture, input devices, voice commands, video recognition, and/or any other techniques. To add components to the media library, the example computing system 46 generates a unique hash of the component data. By generating a unique hash, minor changes to data result in different hashes and enables detection of potential changes to weld programs. The example component is then stored at a location in the media library (e.g., a root folder, a directory, and/or a sub-directory or other location within the data structure of the media library). The components may be moved and re-organized as desired. While the locations of components may be monitored, in other examples the hash can be used to locate a component despite not knowing the location of the component within the data structure of the media library.

Using the interface 1100, the user may navigate through the media library as stored locally and/or at a remote location. For example, when the user accesses a particular location (e.g., directory or sub-directory) via the interface 1100, the computing system 46 accesses the media library at the local and/or remote storage (e.g., via a local area network and/or a wide area network) to determine a list of objects in the media library at the selected location, and display objects (e.g., the components 1102, 1104, the folder 1106) in the media library that are located in the selected locations via the interface 1100.

Figure 12:
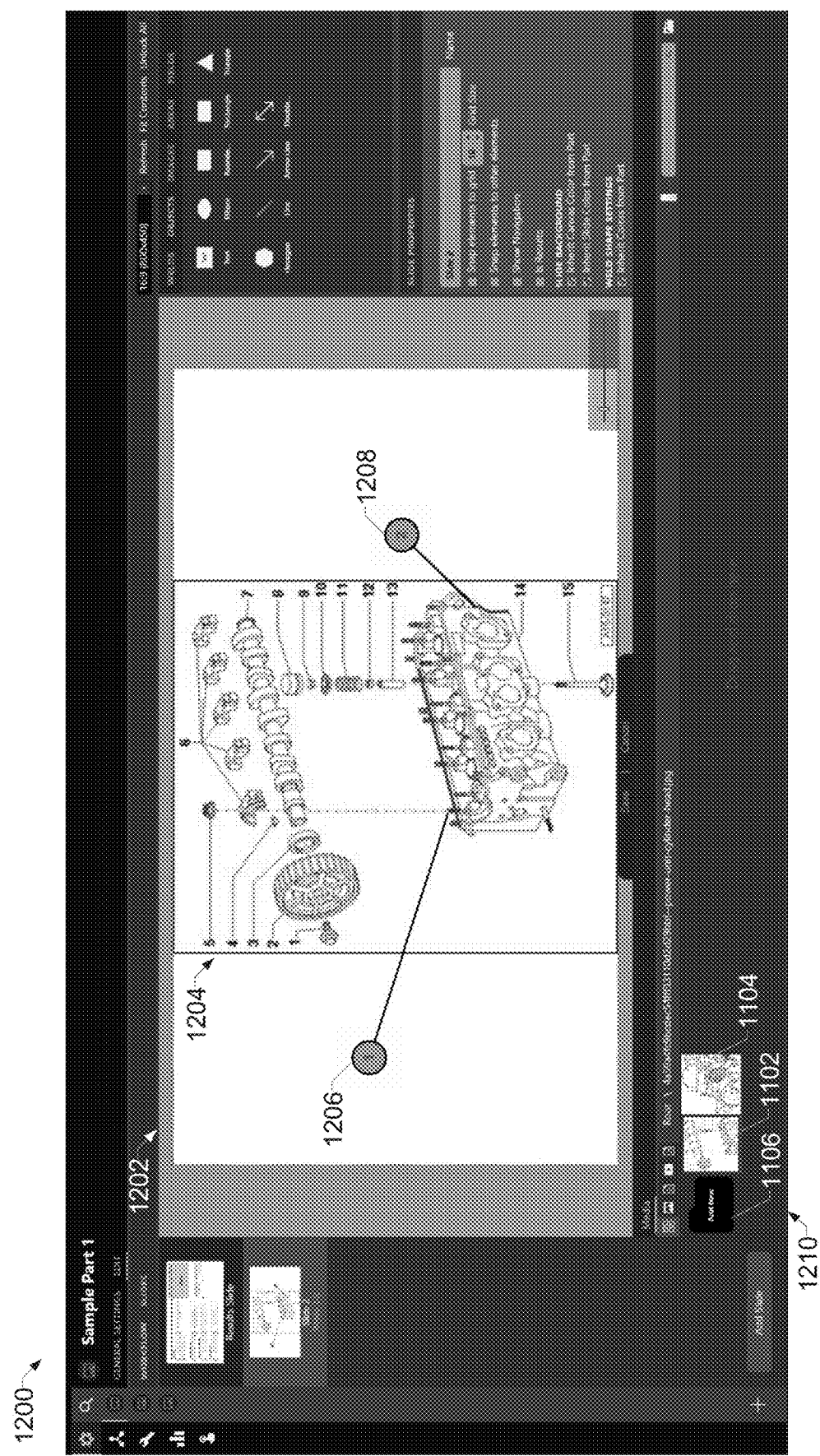
FIG. 12 illustrates an example design interface that may be used to implement the design interface of FIG. 3 to generate a slide of a weld program using components accessed from a media library.

FIG. 12 illustrates an example design interface 1200 that may be used to implement the design interface 302 of FIG. 3 to generate a slide of a weld program using components accessed from a media library. The example design interface 1200 shows a slide 1202 on which an image 1204 has been placed for the purposes of providing information for multiple weld instructions 1206, 1208. The interface 1200 further includes a media library access interface 1210, from which the media library can be navigated and/or components can be added from the media library to the slide 1202. The example components 1102, 1104 and the folder 1106 are shown in the example media library access interface 1208.

To add components to the slides, the example computing system 46 identifies a selection of an object or component in the media library via the interface 1200 and adds the object or component to the slide 1202 of the weld program based on referencing an identifier of the object or component in the media library. For example, the identifier may be one or more of the hash of the selected component, the location of the selected component, the file name of the selected component, and/or any other identifier. When generating the weld program, the computing system 46 creates a reference to the component in the media library using the identifier, such that the computing device 10 can retrieve the component from the media library at a later time. In some examples, the computing system 46 includes with the weld program the component data for components used in the weld program, thereby creating a self-contained weld program (e.g., a weld program that does not rely on an external data connection by the computing device 10 executing the weld program) that also has the benefit of fast and easy creation and modification at the computing system 46.

When modifying a weld program, the interface 1200 loads the weld program and displays the weld program data such as slides, weld instructions, and/or any other weld program data. When an operator desires to update components in the weld program that reference the media library, the operator may update (e.g., replace) the component in the media library instead of updating every instance of the component in the weld program. As a result, the ability for operators to update and maintain weld programs in response to changes to weld procedures is made much easier and faster.

The example interface 1200 may automatically recognize updates or changes to components in the weld program that reference the media library. For example, when loading the weld program into the interface 1200, the computing system 46 may verify the data and/or location of any components that reference the media library. If the computing system 46 identifies a change in a component (e.g., the hash of the component does not match an expected hash in the media library, a unique identifier of the component does not match an expected identifier in the media library, the location of a component having the same hash does not match an expected location of the component in the media library, etc.), the computing system 46 may attempt to resolve the change. For example, if a component is not in an expected location, the computing system 46 may request a location based on a hash of the component in the weld program and, if a location is returned by the media library, update the location of the component in the weld program data (e.g., because the component was moved within the media library but is the same component). Additionally or alternatively, if a component at an expected location does not have a matching hash and/or unique identifier with a corresponding component in the weld program, the computing system 46 may update the weld program with the component data, the hash, and/or the unique identifier (e.g., because the component data was changed).

In some examples, the interface 1100 and/or the interface 1200 enable searching for existing documentation and/or comparison with weld programs and/or media components. For example, the computing system 300 may include a search engine 326 that locates documents pertaining to keywords, image features, or other query elements. For example, a user may specify a part number or other part identifier to the search engine 326, which returns weld programs, weld instructions, media components, and/or other stored procedural documentation. The user may then compare the incoming part instructions to the search results to compare and contrast existing documentation (e.g., weld programs, weld instructions, slides, part images, etc.) with what actually is going on in production. The search engine 326 enables the user to, among other things, compare institutional or worker-level knowledge to procedural documentation for resolution of conflicting information and/or improvement of weld programs and/or weld instructions. For example, if the user determines that a helpful step identified by weld operators is not reflected in a weld program for a part, the user may add slides, weld instructions, audio, video, and/or any other information to add the step to the weld program.

Additionally or alternatively, the weld cell may include one or more sensors (e.g., time of flight sensors, cameras, audio sensors, and/or other sensors) that record activities, gestures, voice commands, operator movement, operator interface interactions, and/or any other observable activity in the weld cell for subsequent processing. The sensors record commands in a time sequence, which can later be processed to generate digital work instructions, either automatically or manually by a user. By converting observed activity into weld instructions, the example computing system 300 may convert the institutional knowledge of a weld engineer and/or a skilled and knowledgeable welding operator at the work piece into usable weld instructions for other operators.

Figure 13:
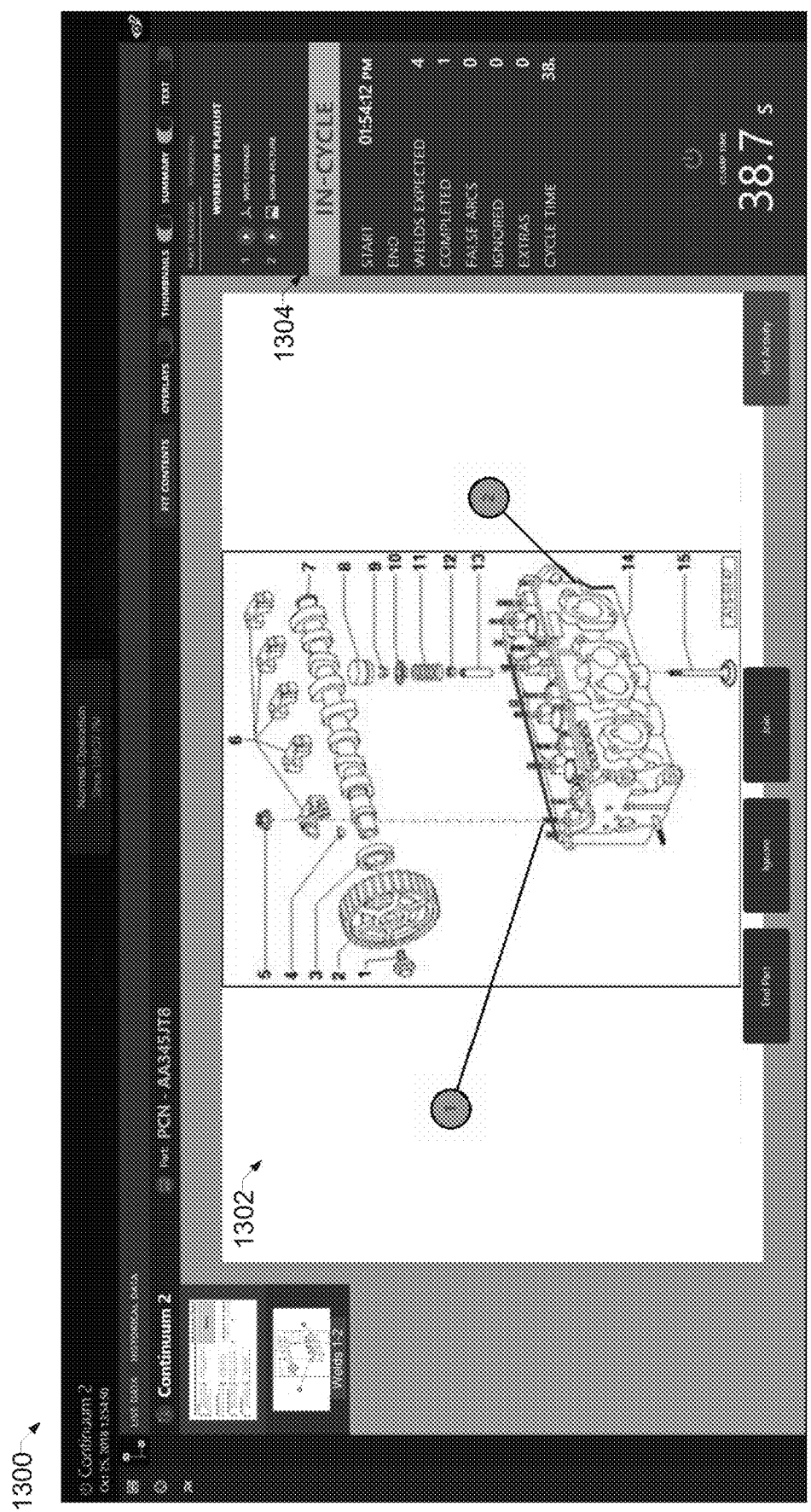
FIG. 13 illustrates an example operator interface that may be used to implement the computing system of FIG. 1 to present a weld program to an operator using components accessed from a media library.

FIG. 13 illustrates an example operator interface 1300 that may be used to implement the computing device 10 of FIG. 1 to present a weld program to an operator using components accessed from a media library. The example interface 1300 includes a display area 1302 on which the weld program is displayed, as well as a workflow data area 1304 that provides information such as clamp time, welds expected, welds completed, false arcs, ignored arcs, extraneous arcs, and/or other information.

The weld program may be defined using one or more components accessible from the media library. The computing device 10 parses the weld program to identify components that are to be accessed from the media library and requests the corresponding components from the media library. For example, the computing device 10 may identify a unique identifier, a hash of the component data, and/or an expected location of the component for identification and retrieval of the component from the media library (e.g., via a local area network and/or a wide area network). The computing device 10 displays the component(s) accessed from the media library in the interface 1300 with weld instructions and/or other component(s) defined in the weld program.

When the unique identifier, a hash of the component data, and/or an expected location of the component does not match the component in the media library, the example computing device 10 may attempt to resolve the component data in a similar manner as the computing system 46 described above (e.g., updating the location, updating the component data, etc.).

A local copy of the media library may be stored at the computing device 10 and/or the computing device 10 may access the remote media library 54 (e.g., via the network 52). In some examples, the computing device 10 may update or synchronize a local copy of the media library with the remote media library 54. Using the updated copy of the media library, the computing device 10 can update weld instructions based on changes to the copy of the media library when executing the weld program.

Figure 14:
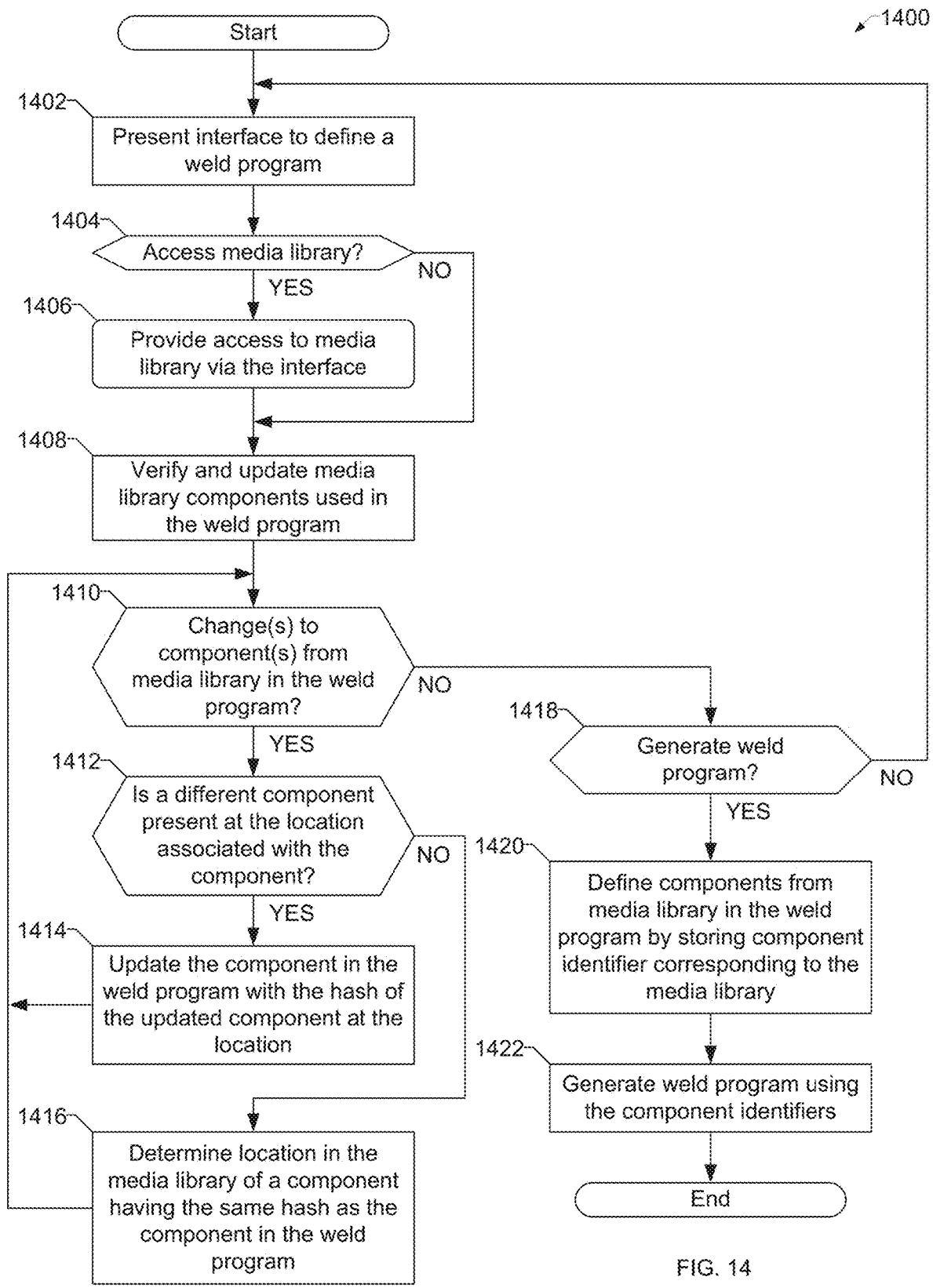
FIG. 14 is a flowchart representative of example machine readable instructions which may be executed to implement the computing system of FIGS. 1 and/or 2 to access a media library storing components that may be used to generate a weld program.

FIG. 14 is a flowchart representative of example machine readable instructions 1400 which may be executed to implement the computing systems 46, 200 of FIGS. 1 and/or 2 to access a media library storing components that may be used to generate a weld program. The example instructions 1400 may be used to implement, for example, the interface 1300 of FIG. 13. The instructions 1400 will be discussed below with reference to the computing system 200 of FIG. 2.

At block 1402, the processor 202 presents an interface (e.g., the interface 1200) to define a weld program. For example, the interface 1200 enables a user to define weld instructions, add media, define reports, and/or otherwise define a weld program for use by a weld operator to weld a part. At block 1404, the processor 202 determines whether a media library is to be accessed (e.g., via the interface 1200). For example, the user may select to manage the media library using the interface 1100 of FIG. 11. If the user selects to access the media library (block 1404), at block 1406 the processor 202 provides access to the media library via the interface (e.g., the interface 1100). Example instructions to implement block 1406 are disclosed below with reference to FIG. 15.

After providing access to the media library (block 1406), or if access to the media library is not selected (block 1404), at block 1408 the processor 202 verifies and updates media library components used in the weld program. For example, the processor 202 may determine whether components of the weld program, such as weld instructions, slides, parts, slide masters, audio data, video data, images, and/or any other components, have changed with reference to the media library. For example, the processor 202 may compare file names, directory locations, component data hashes, unique identifiers, component timestamp metadata, and/or any other information between the weld program and the media library.

The processor 202 stores a reference to each supported media item in the media library (e.g., file system). When a media item is added to the weld program (e.g., an image, media on a slide, media displayed independently of a slide, etc.) the processor 202 stores the unique identifier of the media item with position and/or size metadata. The media library maintains an accurate reference to where the media item is located in the media library (e.g., file system).

The processor 202 may use file system events to determine when and/or how the media library has changed. For example, the processor 202 may identify modifications that occurred while a media library management process was not executing using, for example, file metadata, hashes of media content, and/or other data, databases, and/or logs to resolve changes to the media library that may have occurred when the media library management process was not actively running.

At block 1410, the processor 202 determines whether any changes to one or more components from the media library have occurred in the weld program. If changes have occurred (block 1410), at block 1412 the processor 202 determines whether a different component is present at the location associated with a component in the weld program. For example, the processor 202 may determine whether a component having the same location, file name, and/or unique identifier has a different data hash. If a different component is present at the location associated with a component in the weld program (block 1412), at block 1414 the processor 202 updates the component in the weld program with the hash of the updated component at the location (e.g., because the component has been replaced with a new component). For example, the processor 202 may update the component data and/or component metadata in the weld program with the updated data and/or metadata. Control then returns to block 1410 to process additional change(s).

If the location associated with a component in the weld program does not have a different component (block 1412), at block 1416 the processor 202 determines the location in the media library of a component having the same hash as the component in the weld program. For example, the processor 202 may execute or request a query using the hash or other uniquely identifying data of the component data to determine whether the component data has been moved to a different directory. Upon locating the location of the component, the processor 202 updates the weld program with the new location of the component in the media library. Control then returns to block 1410 to process additional change(s).

When there are no further changes to components in the weld program (block 1410), at block 1418 the processor 202 determines whether to generate the weld program. For example, the user may select to save the defined weld program. If the weld program is not to be generated (block 1418), control returns to block 1402 to continue presenting the interface 1200.

When the weld program is to be generated (block 1418), at block 1420 the processor 202 defines components from the media library in the weld program by storing component identifiers that correspond to the media library. For example, the processor 202 may define the component in the weld program (e.g., in a JSON, XML or other format that may represent the weld program) using file names, directory locations, component data hashes, unique identifiers, component timestamp metadata, and/or any other information that may reference or describe the components in the media library. At block 1422, the processor 202 generates the weld program using the determined component identifiers. The example instructions 1400 may then end, or may iterate to block 1402 to continue presenting the interface 1200.

Figure 15:
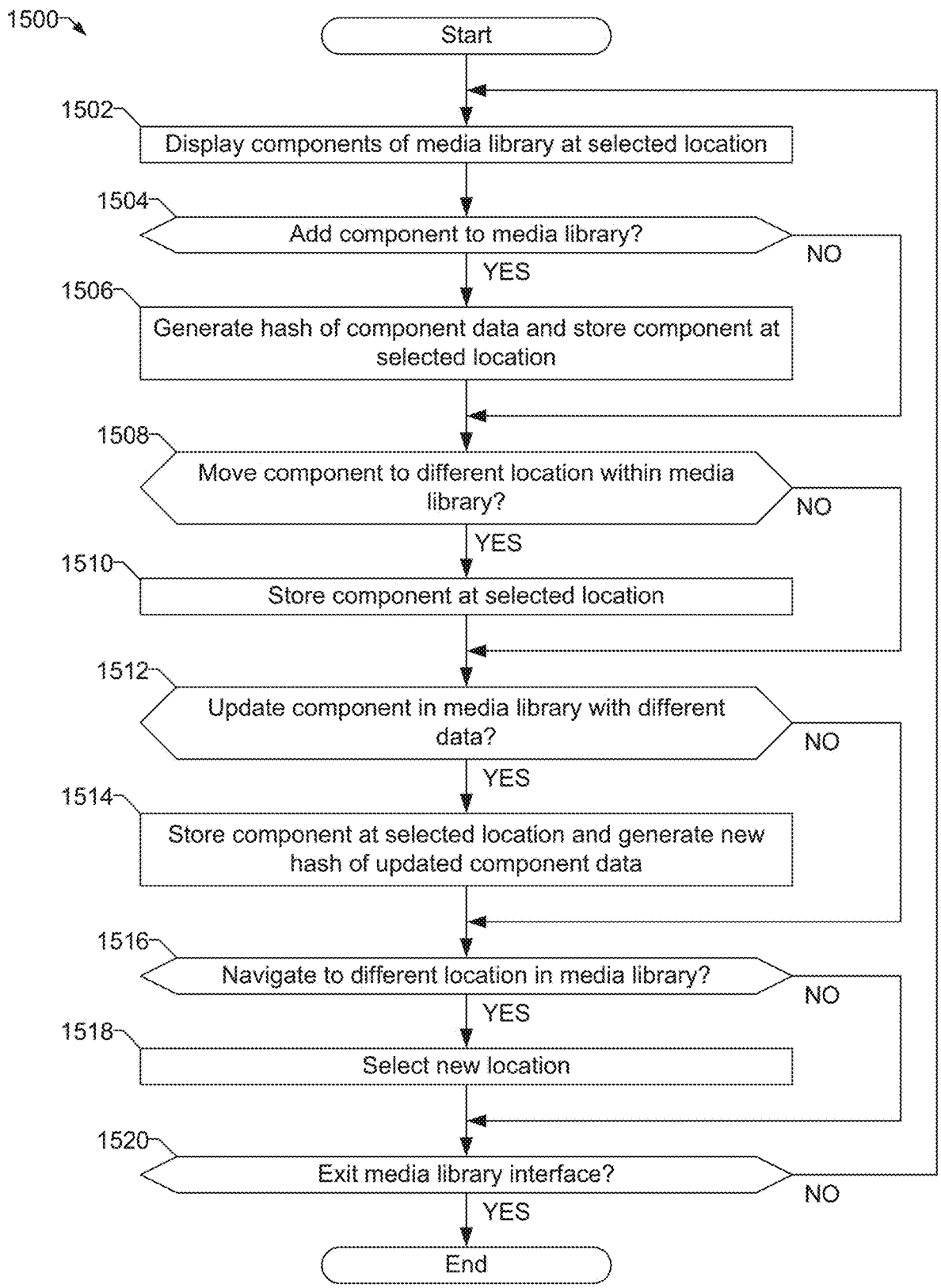
FIG. 15 is a flowchart representative of example machine readable instructions which may be executed to implement the computing system of FIGS. 1 and/or 2 to provide a media library.

FIG. 15 is a flowchart representative of example machine readable instructions which may be executed to implement the computing system 46 of FIGS. 1 and/or 2 to provide a media library. The example instructions 1500 may be executed (e.g., by the processor 202 of FIG. 2) to implement block 1406 of FIG. 14 and/or to present the interface 1100 of FIG. 11.

At block 1502, the processor 202 displays components stored in the media library at a selected location. For example, the processor 202 may display the components stored at the root level and/or a directory selected by the user. At block 1504, the processor 202 determines whether a component is to be added to the media library. For example, the user may drag and drop a component from the operating system to the interface 1100, select an object from a weld program via the interface 1100, and/or otherwise selects a component to be added to the media library. If a component is to be added (block 1504), at block 1506 the processor 202 generates a hash of the component data and stores the component at a selected location in the media library.

After adding a component (block 1506) or if a component is not to be added (block 1504), at block 1508 the processor 202 determines whether a component is to be moved to a different location within the media library. If a component is to be moved (block 1508), at block 1510 the processor 202 stores the component at the selected location. In some examples, the processor 202 may determine weld programs that reference the component and update the weld programs with the updated location.

After moving the component (block 1510), or if a component is not selected for moving (block 1508), at block 1512 the processor 202 determines whether a component in the media library is to be updated with different data. For example, a user may select to replace a component with a different data. For example, the user may update an image to be used in weld programs with a different image to reflect a change in the desired welding procedure. If a component is to be updated (block 1512), at block 1514 the processor 202 stores the component at the selected location and generates a new hash of updated component data. In some examples, the processor 202 may determine weld programs that reference the component and update the weld programs with the updated data and/or hash.

After storing the component (block 1514), or if no components are to be updated (block 1512), at block 1516 the processor 202 determines whether to navigate to a different location in the media library. For example, the user may select a directory or sub-directory in the interface 1100. If a different location is selected (block 1516), at block 1518 the processor 202 selects the new location for display via the interface 1100.

After selecting the new location (block 1518), or if a different location has not been selected (block 1516), at block 1520 the processor 202 determines whether to exit the media library interface 1100 (e.g., to the interface 1200 of FIG. 12). If the media library interface 1100 is not to be exited (block 1520), control returns to block 1502. When the media library interface 1100 is to be exited (block 1520), the example instructions 1500 end and control returns to block 1406.

Figure 16:
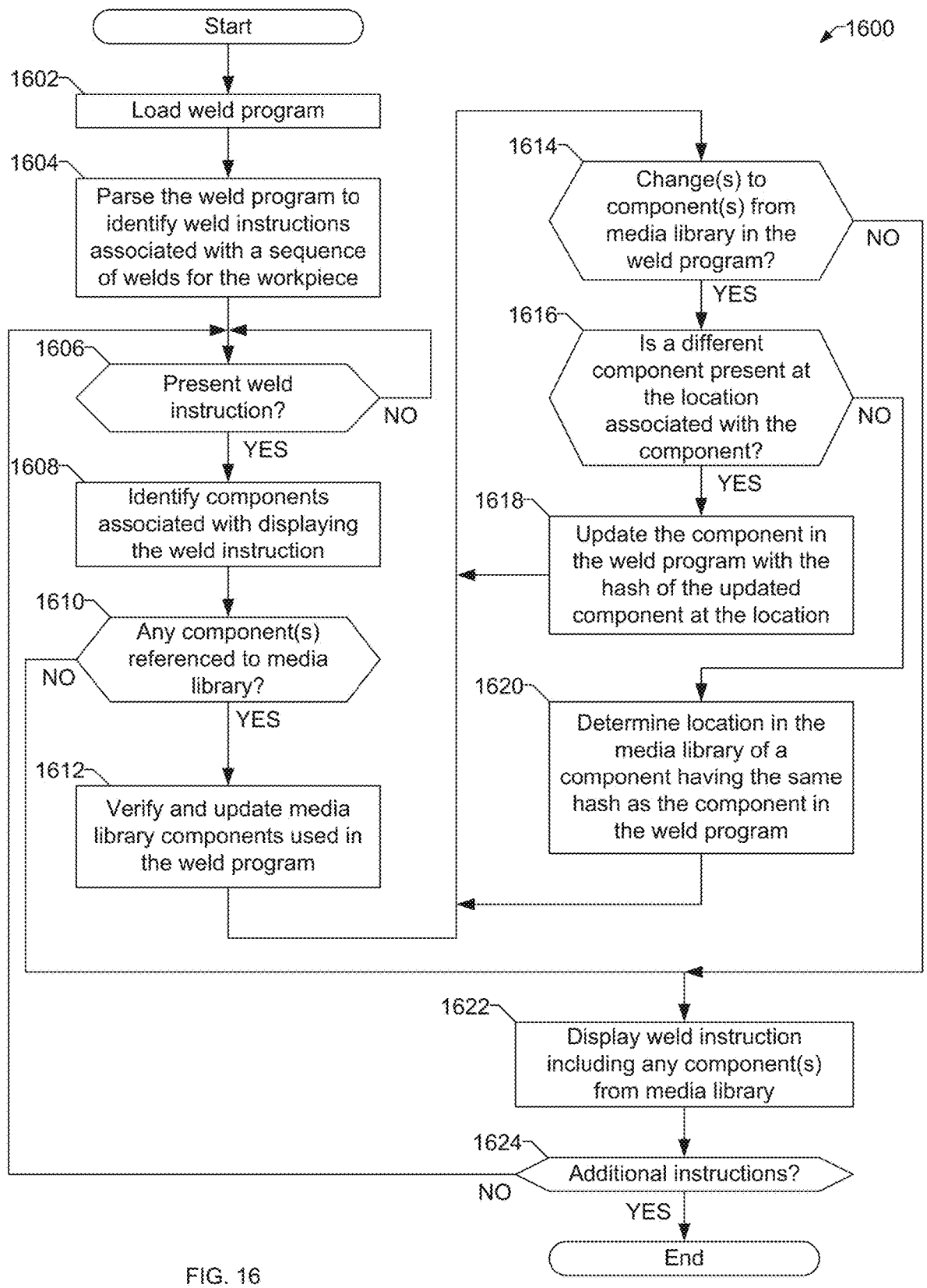
FIG. 16 is a flowchart representative of example machine readable instructions which may be executed to implement the computing system of FIGS. 1 and/or 2 to present a weld program to an operator using components accessed from a media library.

FIG. 16 is a flowchart representative of example machine readable instructions 1600 which may be executed to implement the computing device 10 and/or the computing system 200 of FIGS. 1 and/or 2 to present a weld program to an operator using components accessed from a media library. For example, the instructions 1600 may be used to implement the interface 1300 of FIG. 13.

At block 1602, the processor 202 (e.g., a processor of the computing device 10) loads a weld program. The weld program may be selected by a weld operator or automatically selected based on sensor data. At block 1604, the computing device 10 parses the weld program to identify weld instructions associated with a sequence of welds. For example, the computing device 10 may identify the weld instructions and components of the weld program.

At block 1606, the processor 202 determines whether a weld instruction is to be presented (e.g., via the interface 1300 of FIG. 13). For example, weld instructions may be presented in response to clamping of a part, completion of a prior weld instruction, resuming of a weld operation following a break, and/or any other event. If a weld instruction is not to be presented (block 1606), control iterates to block 1606 until a weld instruction is to be presented. In some examples, the processor 202 continues displaying a current weld instruction or interface while waiting for a subsequent weld instruction at block 1606.

When a weld instruction is to be presented (block 1606), at block 1608 the processor 202 identifies components associated with displaying the welding instruction. For example, the processor 202 may identify the components in a JSON, XML, or other data file representing the weld program. At block 1610, the processor 202 determines whether one or more identified component(s) are referenced to a media library. For example, the processor 202 may recognize a URI or similar identifier, a data tag referencing the media library, and/or any other reference to the media library in association with an identified component.

If there is a component that is referenced to the media library (block 1610), at block 1612 the processor 202 verifies and updates the media library components used in the weld program. For example, the processor 202 may determine whether components of the weld program, such as weld instructions, slides, parts, slide masters, audio data, video data, images, and/or any other components, have changed with reference to the media library. For example, the processor 202 may compare file names, directory locations, component data hashes, unique identifiers, component timestamp metadata, and/or any other information between the weld program and the media library.

At block 1614, the processor 202 determines whether any changes to one or more components from the media library have occurred in the weld program. If changes have occurred (block 1614), at block 1616 the processor 202 determines whether a different component is present at the location associated with a component in the weld program. For example, the processor 202 may determine whether a component having the same location, file name, and/or unique identifier has a different data hash. If a different component is present at the location associated with a component in the weld program (block 1616), at block 1618 the processor 202 updates the component in the weld program with the hash of the updated component at the location (e.g., because the component has been replaced with a new component). For example, the processor 202 may update the component data and/or component metadata in the weld program with the updated data and/or metadata. Control then returns to block 1614 to process additional change(s).

If the location associated with a component in the weld program does not have a different component (block 1616), at block 1620 the processor 202 determines the location in the media library of a component having the same hash as the component in the weld program. For example, the processor 202 may execute or request a query using the hash or other uniquely identifying data of the component data to determine whether the component data has been moved to a different directory. Upon locating the location of the component, the processor 202 updates the weld program with the new location of the component in the media library. Control then returns to block 1614 to process additional change(s).

Blocks 1612-1620 may be implemented in a similar or identical manner to blocks 1408-1416 of FIG. 14.

When there are no further changes to components in the weld program (block 1614), or if there are no component(s) referenced to the media library for the weld instruction (block 1610), at block 1622 the processor 202 displays the weld instruction including any component(s) from the media library. At block 1624, the processor 202 determines whether there are additional weld instructions in the weld program. If there are additional weld instructions (block 1624), control returns to block 1606. When there are no more weld instructions (block 1624), the instructions 1600 end.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A system to generate weld instructions for display to a weld operator during a welding sequence, the system comprising:
   a processor; and
   a machine readable storage device comprising machine readable instructions which, when executed by the processor, cause the processor to:
   provide an interface to define a weld program, the weld program comprising a sequence of visual weld instructions for display to a weld operator during a weld sequence;
   in response to an input received via the interface and specifying a file location of an object in a media library, define an element in the weld program based on the file location of the object in the media library or a reference to the object in the media library;

generate the weld program by including in the weld program the reference to the object in the media library or the location of the object in the media library in association with the element, the generating further comprising:
  comparing a first hash value of the element in the weld program to a second hash value of the object in the media library corresponding to the reference to the object in the media library or location of the object in the media library to determine whether the object in the media library is different than the element, and,
  if the second hash value of the object in the media library is not at an expected file location, request an updated file location based on the first hash value; and
  update the weld program by replacing the element in the weld program when the element in the weld program is different than the object in the media library.

2. The system as defined in claim 1, wherein the instructions cause the processor to:
  access the media library to determine a list of objects in the media library; and
  display at least a subset of the objects in the media library via the interface.

3. The system as defined in claim 2, wherein the instructions cause the processor to:
  identify a selection of the object in the media library via the interface; and
  add the object to a slide of the weld program based on referencing the reference to the object in the media library or the location of the object in the media library.

4. The system as defined in claim 2, wherein the instructions cause the processor to:
  identify a selection of the object in the media library via the interface;
  generate a weld instruction based on referencing the reference to the object in the media library or the location of the object in the media library; and
  generate the weld program to include the weld instruction.

5. The system as defined in claim 2, wherein the instructions cause the processor to:
  identify a change to the object at the reference to the object in the media library or the location in the media library; and
  update the display of the subset of the objects in the media library.

6. The system as defined in claim 1, wherein the instructions cause the processor to access the media library via at least one of a local area network or a wide area network.

7. The system as defined in claim 1, wherein the instructions cause the processor to authenticate at least one of the interface, a user of the interface, or an owner of the interface prior to accessing the media library.

8. The system as defined in claim 1, wherein the reference to the object in the media library or the location of the object comprises at least one of a location of the object in a data structure of the media library or a globally unique identifier of the object.

9. The system as defined in claim 1, wherein the instructions cause the processor to:
  in response to identifying a change in location of the object in the media library, request a location based on the second hash value associated with the object; and
  update a location of the object in the weld program.

10. The system as defined in claim 1, wherein the object comprises at least one of: image data, audio data, video data, a weld program comprising a plurality of weld instructions, a slide template, a three-dimensional model, or a part.

11. The system as defined in claim 1, wherein the instructions cause the processor to:
  access a second object; and
  provide the second object to the media library for storage.

12. The system as defined in claim 11, wherein the reference to the media library comprises at least one of a virtual location of the object or a globally unique identifier of the object.

13. The system as defined in claim 11, wherein the reference is associated with at least one of: image data, audio data, video data, a weld program comprising a plurality of weld instructions, a slide template, a three-dimensional model, or a part.

14. The system as defined in claim 13, wherein the computing device is configured to update the reference in the weld program with an updated location of the object based on the response.

15. The system as defined in claim 11, wherein the computing device is configured to:
  in response to identifying a change in location of an object in the media library based on the reference, request the object based on the second hash value associated with the object; and
  display the at least one of the weld instructions based on a response to the request.

16. A system for monitoring welding of components of a workpiece with multiple arc welds in a fixture, the system comprising:
  a computing device storing a weld program defining weld instructions for performing the multiple arc welds, the computing device configured to:
    parse the weld program to identify weld instructions associated with a sequence of welds for the workpiece;
    for at least one of the weld instructions, identify a media element in the weld program that is associated with a first hash value and associated with a reference to a media library external to the weld program;
    compare whether the first hash value matches a second hash value associated with an object identified via the reference to the media library, and if the second hash value of the object in the media library is not at an expected file location, request an updated file location based on the first hash value;
    in response to determining that the first hash value does not match the second hash value, resolve the media element by at least one of updating the reference to the media library or updating the media element based on the object identified via the reference; and
    display the at least one of the weld instructions including the resolved media element based on the reference to the media library.

17. The system as defined in claim 16, wherein the computing device is configured to store a copy of the media library on a local storage device of the computing device.

18. The system as defined in claim 17, wherein the computing device is configured to:
  update the copy of the media library; and
  update the weld instruction based on changes to the copy of the media library.

19. The system as defined in claim 16, further comprising one or more weld sensors configured to collect data associated with the multiple arc welds, wherein the computing device is configured to determine statuses of the multiple arc welds based on the data.

\* \* \* \* \*